(12) United States Patent
Duong et al.

(10) Patent No.: US 11,790,901 B2
(45) Date of Patent: Oct. 17, 2023

(54) TASK-ORIENTED DIALOG SUITABLE FOR A STANDALONE DEVICE

(71) Applicant: Oracle International Corporation, Redwood Shores, CA (US)

(72) Inventors: Thanh Long Duong, Seabrook (AU); Mark Edward Johnson, Sydney (AU); Vu Cong Duy Hoang, Wantirna South (AU); Tuyen Quang Pham, Melbourne (AU); Yu-Heng Hong, Carlton (AU); Vladislavs Dovgalecs, Bellevue, WA (US); Guy Bashkansky, Bellevue, WA (US); Jason Eric Black, Redwood Shores, CA (US); Andrew David Bleeker, Burien, WA (US); Serge Le Huitouze, Ercé-pèrs-Liffré (FR)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/092,170

(22) Filed: Dec. 30, 2022

(65) Prior Publication Data

US 2023/0186914 A1 Jun. 15, 2023

Related U.S. Application Data

(63) Continuation of application No. 17/005,847, filed on Aug. 28, 2020, now Pat. No. 11,574,636.

(60) Provisional application No. 62/893,302, filed on Aug. 29, 2019.

(51) Int. Cl.
*G10L 15/22* (2006.01)

(52) U.S. Cl.
CPC .................... *G10L 15/22* (2013.01)

(58) Field of Classification Search
CPC ..................................... G10L 15/22
See application file for complete search history.

(56) References Cited

U.S. PATENT DOCUMENTS

2018/0226076 A1* 8/2018 Kotti et al. ............ G10L 15/22

OTHER PUBLICATIONS

Bahdanau, et al., "Neural Machine Translation By Jointly Learning To Align And Translate", Published as a conference paper at ICLR 2015, pp. 1-15.
Charfuelan, et al., "Expressive speech synthesis in Mary TTS using audiobook data and EmotionML", DFKI GmbH, Language Technology Lab, pp. 1-5.
Dong, et al., "Language to Logical Form with Neural Attention", ACL, , Jun. 6, 2016, pp. 1-11.

(Continued)

*Primary Examiner* — Ibrahim Siddo
(74) *Attorney, Agent, or Firm* — Kilpatrick Townsend & Stockton LLP

(57) ABSTRACT

Described herein are dialog systems, and techniques for providing such dialog systems, that are suitable for use on standalone computing devices. In some embodiments, a dialog system includes a dialog manager, which takes as input an input logical form, which may be a representation of user input. The dialog manager may include a dialog state tracker, an execution subsystem, a dialog policy subsystem, and a context stack. The dialog state tracker may generate an intermediate logical form from the input logical form combined with a context from the context stack. The context stack may maintain a history of a current dialog, and thus, the intermediate logical form may include contextual information potentially missing from the input logical form. The execution subsystem may execute the intermediate logical form to produce an execution result, and the dialog policy subsystem may generate an output logical form based on the execution result.

20 Claims, 10 Drawing Sheets

(56) References Cited

OTHER PUBLICATIONS

Johnson, "Attribute Value Logic and The Theory of Grammar", CSLI Lecture Notes Series, Volume 16, Chicago University Press, Chicago, retrieved from https://www.bibliovault.org/cgi-bin/DeliverADE.epl?transid=BWqvRPZLFI6Bqvlt , 1989.

Li, "Efficient Hyperparameter Optimization And Infinitely Many Armed Bandits", CoRR, Abstract, 2016, pp. 1-2.

Okazaki, "Crfsuite: A fast implementation of Conditional Random Fields (CRFs)", NaoakiOkazakiwebsite, 4, 2016, pp. 1-4.

Ping, et al., "Deep Voice 3: Scaling Text-To-Speech With Convolutional Sequence Learning", Published as a conference paper at ICLR 2018, pp.1-16.

Povey, et al., "The Kaldi Speech Recognition Toolkit", IEEE Signal Processing Society, 2011, pp. 1-4.

Shen, et al., "Natural TTS Synthesis by Conditioning WaveNet on Mel Spectrogram Predictions", CoRR, arXiv.org > cs > arXiv:1712.05884,2017, pp. 1-5.

Wang, et al., "Building a SemanticParserOvernight", In ACL, 2015,1332-1342.

Young, "Cued Standard DialogueActs", Report, Cambridge University Engineering Department, Jun. 19, 2009, pp. 1-13.

Zettlemoyer, et al., "Learning to Map Sentences to Logical Form: Structured Classification with Probabilistic Categorial Grammars", Proceedings of the Twenty-First Conference on Uncertainty in Artificial Intelligence, 2005, pp. 1-9.

\* cited by examiner

TASK-ORIENTED DIALOG SUITABLE FOR A STANDALONE DEVICE

CROSS-REFERENCE TO RELATED APPLICATIONS

The present disclosure claims priority to U.S. Non-Provisional Application Serial No. 17/005,847 for "Task-Oriented Dialog Suitable For A Standalone Device," filed Aug. 28, 2020, and U.S. Provisional Application Serial No. 62/893,302 for "Task-Oriented Dialog in a Standalone Device," filed Aug. 29, 2019, which are incorporated by reference herein in its entirety.

TECHNICAL FIELD

The present disclosure relates to dialog systems and, more particularly, to techniques for providing and using a task-oriented dialog system that is suitable for a standalone device, such that a dialog manager of the dialog system is configured with a combination of machine learning and rules-based aspects that configures the dialog system to provide a dialog related to a task without reliance on peripherals or a network connection.

BACKGROUND

An increasing number of devices now enable users to interact with the devices directly using voice or spoken speech. For example, a user can speak to such a device in a natural language, and in doing so, the user can ask a question or make a statement requesting an action to be performed. In response, the device performs the requested action or responds to the user's question using audio output. Since interacting directly using voice is a more natural and intuitive way for humans to communicate with their surroundings, the popularity of such speech-based systems is growing at an astronomical rate.

BRIEF SUMMARY

A dialog system is a voice-enabled system capable of having a dialog with a user, such as via speech inputs and audio outputs. The present disclosure relates to a dialog system that is suitable for use on a standalone computing device, such as a computing device without access to peripherals and without a network connection. Some embodiments of the dialog system include a combination of machine learning and rules-based components to enable the dialog system to take up a relatively small amount of computing resources while effectively provided a dialog and task execution in a specific domain.

In some embodiments, a dialog system includes an input pipeline, a dialog manager, and an output pipeline. The input pipeline includes one or more subsystems of the dialog system that translate user input into an input logical form, and the output pipeline includes one or more subsystems of the dialog system that translate an output logical form into an output provided to the user. In some embodiments, the dialog manager takes the input logical form as input, performs task execution as needed, and constructs the output logical form.

The dialog manager may include a dialog state tracker, an execution subsystem, a dialog policy subsystem, and a context stack. The dialog state tracker may generate an intermediate logical form from the input logical form as combined with a context from the context stack. The context stack may maintain a history of the current conversation between a user and the dialog system, and thus the intermediate logical form may include contextual information that might be missing from the input logical form. The execution subsystem may execute the intermediate logical form to produce an execution result, and the dialog policy subsystem may generate an output logical form based on execution result.

The foregoing, together with other features and embodiments will become more apparent upon referring to the following specification, claims, and accompanying drawings.

DETAILED DESCRIPTION

Figure 1:
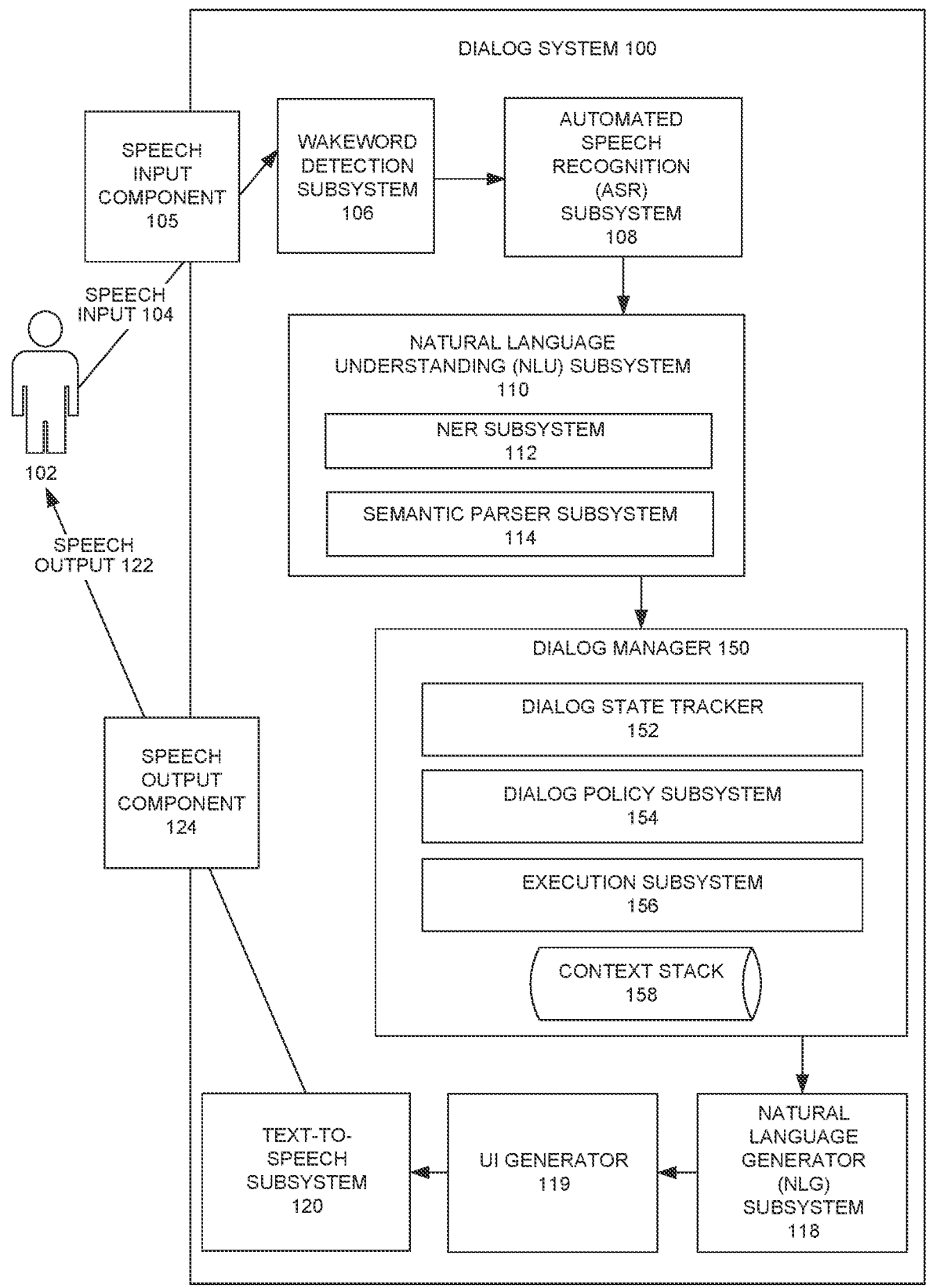
FIG. 1 is a diagram of an example of a dialog system that is suitable for use in a standalone device, according to certain embodiments described herein.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" or as an "example" is not necessarily to be construed as preferred or advantageous over other embodiments or designs.

A voice-enabled system that is capable of having a dialog with a user via speech inputs and audio outputs, also referred to as voice outputs, can come in various forms. For example, such a system may be provided as a standalone device, as a digital or virtual assistant, as a voice-capable service, or the like. In each of these forms, the system is capable of receiving speech inputs, understanding the speech inputs, generating responses or taking actions responsive to the speech inputs, and outputting the responses using audio outputs. In certain embodiments, the dialog functionality in such a voice-enabled system is provided by a dialog system or infrastructure ("dialog system"). The dialog system is configured to receive speech inputs, interpret the speech inputs, maintain a dialog, possibly perform or cause one or more actions to be performed based on interpretations of the speech inputs, prepare appropriate responses, and output the responses to the user using audio output.

Although communicating directly using voice is a natural way for a human user to interact with computers or household appliances, sometimes it can be costly to provide in a device the functionality to interpret and respond to voice communications. People can already interact with smart appliances, such as microwaves and alarm clocks, using voice control, but these devices need to connect to cloud services to process user requests. This is because many devices do not have the computing resources needed to run a dialog system locally.

Some embodiments described herein are dialog systems that are suitable for use on a standalone computing device, such as an embedded device. For instance, some embodiments of a dialog system described herein can run entirely on a standalone device without requiring access to peripherals or to a network. To this end, the dialog system may include a combination of machine learning components and rules-based components, and one or more of such components (e.g., subsystems) may be domain specific to achieve a smaller size orto otherwise reduce the computing resources needed for implementation. In some embodiments, classifier-based and deep learning approaches are reserved for a natural language understanding subsystem of the dialog system, because linguistic variation and construction would be difficult to capture with a set of rules. However, the dialog system may include a rules-based dialog manager and a rules-based natural language generator subsystem. Further, to provide adaptability across domains, domain-specific code may be concentrated in an automatic speech recognition sub system, the natural language understanding subsystem, and a natural language generator subsystem of the dialog system.

In some embodiments, the dialog manager of the dialog system is rules based and domain specific. The dialog manager may be responsible for task execution and for determining an interaction with a user based on user input. Some embodiments of a dialog manager include a dialog state tracker, an execution subsystem, a dialog policy subsystem, and a context stack. The dialog state tracker may generate an intermediate logical form from an input logical form, determined by one or more other subsystems of the dialog system as a representation of user input, combined with a context from the context stack. The context stack may maintain a history of a current dialog, and as a result, the intermediate logical form may include contextual information potentially missing from the input logical form. The execution subsystem may execute the intermediate logical form by, for example, translating the intermediate logical form to a query and executing the query against a database. The dialog policy subsystem may generate an output logical form based on a result of the execution. One or more other subsystems of the dialog system may translate the output logical form into an output for the user, thus providing a dialog.

Certain embodiments described herein improve upon existing dialog systems by reducing the computing resources needed to effectively implement a dialog system. For instance, an example of a dialog system described herein is an end-to-end task-oriented dialog system suitable for standalone devices, such as home appliances or other embedded devices, for example. In some embodiments, to enable the dialog system to remain small, certain subsystems are domain specific (i.e., configured for a certain domain of tasks); however, to enable portability, the domain-specific aspects are concentrated in such subsystems to make it easy to adapt other subsystems of the dialog system across domains. Some embodiments of a dialog system described herein do not require internet connectivity because all components, including speech recognition, natural language understanding, dialog management, execution, and text-to-speech, can run locally on a standalone device. This can simplify deployment, reduce server costs, and eliminate the privacy risks involved in performing tasks of a dialog system over a network.

FIG. 1 is a diagram of an example of a dialog system 100 that is suitable for use in a standalone device, according to certain embodiments described herein. The dialog system 100 is configured to receive speech inputs 104, also referred to as voice inputs, from a user 102. The dialog system 100 may then interpret the speech inputs 104. The dialog system 100 may maintain a dialog with a user 102 and may possibly perform or cause one or more actions to be performed based upon interpretations of the speech inputs 104. The dialog system 100 may prepare appropriate responses and may output the responses to the user using voice or speech output, also referred to as audio output. The dialog system 100 is a specialized computing system that may be used for processing large amounts of data potentially using a large number of computer processing cycles. The numbers of devices depicted in FIG. 1 are provided for illustrative purposes. Different numbers of devices may be used. For example, while each device, server, and system in FIG. 1 is shown as a single device, multiple devices may be used instead.

In certain embodiments, the processing performed by the dialog system 100 is implemented by a pipeline of components or subsystems, including a speech input component 105; a wake-word detection (WD) subsystem 106; an automatic speech recognition (ASR) subsystem 108; a natural language understanding (NLU) subsystem 110, which includes a named entity recognizer (NER) subsystem 112 and a semantic parser subsystem 114; a dialog manager (DM) subsystem 150; a natural language generator (NLG) subsystem 118; a text-to-speech (TTS) subsystem 120; and a speech output component 124. Some example embodiments also include a user interface (UI) generator 119, which can enable the dialog system 100 to operate with an available output device, for instance, in a case where a speech output component 124 is not available. The subsystems listed above may be implemented only in software (e.g., using code, a program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and be communicatively coupled to the dialog system 100. The speech input component 105 may, for example, include a microphone coupled to software configured to digitize and transmit speech input 104 to the wake-word detection subsystem 106.

The wake-word detection (WD) subsystem 106 is configured to listen for and monitor a stream of audio input for input corresponding to a special sound or word or set of words, referred to as a wake-word. Upon detecting the wake-word for the dialog system 100, the WD subsystem 106 is configured to activate the ASR subsystem 108. In certain implementations, a user may be provided the ability to activate or deactivate the WD subsystem 106 (e.g., by pushing a button) to cause the WD subsystem 106 to listen for or stop listening for the wake-word. When activated, or when operating in active mode, the WD subsystem 106 is configured to continuously receive an audio input stream and process the audio input stream to identify audio input, such as speech input 104, corresponding to the wake-word. When audio input corresponding to the wake-word is detected, the WD subsystem 106 activates the ASR subsystem 108.

As described above, the WD subsystem 106 activates the ASR subsystem 108. In some implementations of the dialog system 100, mechanisms other than wake-word detection may be used to trigger or activate the ASR subsystem 108. For example, in some implementations, a push button on a device may be used to trigger the ASR subsystem 108 without needing a wake-word. In such implementations, the WD subsystem 106 need not be provided. When the push button is pressed or activated, the speech input 104 received after the button activation is provided to the ASR subsystem 108 for processing. Additionally or alternatively, in some implementations, the ASR subsystem 108 may be activated upon receiving an input to be processed.

The ASR subsystem 108 is configured to receive and monitor speech input 104 after a trigger or wake-up signal (e.g., a wake-up signal may be sent by the WD subsystem 106 upon the detection of the wake-word in the speech input 104, or the wake-up signal may be received upon the activation of a button) and to convert the speech input 104 to text. As part of its processing, the ASR subsystem 108 performs speech-to-text conversion. The speech input 104 may be in a natural language form, and the ASR subsystem 108 is configured to generate the corresponding natural language text in the language of the speech input 104. This corresponding natural language text is referred to herein as an utterance. For instance, the speech input 104 received by the ASR subsystem 108 may include one or more words, phrases, clauses, sentences, questions, or the like. The ASR subsystem 108 is configured to generate an utterance for each spoken clause and feed the utterances to the NLU subsystem 110 for further processing.

Some embodiments of a dialog system 100 described herein are used in, or suitable for use in, a standalone computing device, such as a small embedded device. As such, certain components are designed to be compact and potentially to operate without the use of peripherals or a network connection. To this end, an example of the ASR subsystem 108 is deep neural network (DNN)-based acoustic model combined with a fast Hidden Markov Model (HMM)-based language model decoder. As such, a vocabulary of the ASR subsystem 108 can be easily customized to allow the ASR subsystem 108 to be tailored for a particular domain. In some embodiments, the ASR subsystem 108 also provides a confidence score based on an HMM posterior probability, which the DM subsystem 150 can use to detect cases of ASR failure.

The NLU subsystem 110 receives utterances generated by the ASR subsystem 108. The utterances received by the NLU subsystem 110 from the ASR subsystem 108 may include text utterances corresponding to spoken words, phrases, clauses, or the like. The NLU subsystem 110 translates each utterance, or a series of utterances, to a corresponding logical form.

In certain implementations, the NLU subsystem 110 includes a named entity recognizer (NER) subsystem 112 and a semantic parser subsystem 114. The NER subsystem 112 receives an utterance as input, identifies named entities in the utterance, and tags the utterance with information related to the identified named entities. The tagged utterances are then fed to the semantic parser subsystem 114, also referred to as the semantic parser 114 which is configured to generate a logical form for each tagged utterance or for a series of tagged utterances. The logical form generated for an utterance may identify one or more intents corresponding to the utterance. An intent for an utterance identifies an objective of the utterance. Examples of intents include "order pizza" and "find directions." An intent may, for example, identify an action that is requested to be performed. In addition to intents, a logical form generated for an utterance may also identify slots, also referred to as parameters or arguments, for an identified intent. For example, for the speech input "I'd like to order a large pepperoni pizza with mushrooms and olives," the NLU subsystem 110 can identify the intent order pizza. The NLU subsystem can also identify and fill slots, e.g., pizza_size (filled with large) and pizza_toppings (filled with mushrooms and olives). The NLU subsystem 110 may use machine learning based techniques, rules, which may be domain specific, or a combination of machine learning techniques and rules to generate the logical forms. The logical forms generated by the NLU subsystem 110 are then fed to the DM subsystem 150 for further processing.

In an example embodiment of the dialog system 100 suitable for a standalone computing device, the NER subsystem 112 is or includes a conditional random fields (CRF) tagger, and the semantic parser subsystem 114 is or includes a deep learning sequence-to-sequence (seq2seq) model. Because it can be challenging to fit a seq2seq model into a small embedded device, some embodiments can use extensive hyper-parameter tuning with a successive halving process.

The DM subsystem 150 is configured to manage a dialog with the user based on logical forms received from the NLU subsystem 110. As part of the dialog management, the DM subsystem 150 is configured to track dialog states, initiate the execution of or itself execute one of more actions or tasks, and determine how to interact with the user. These actions may include, for example, querying one or more databases, producing execution results, or other actions. For example, the DM subsystem 150 is configured to interpret the intents identified in the logical forms received from the NLU subsystem 110. Based on the interpretations, the DM subsystem 150 may initiate one or more actions that it interprets as being requested by the speech inputs 104 provided by the user. In certain embodiments, the DM subsystem 150 performs dialog-state tracking based on current and past speech inputs 104 and based on a set of rules (e.g., dialog policies) configured for the DM subsystem 150. These rules may specify the different dialog states, conditions for transitions between states, actions to be performed when in a particular state, or the like. These rules may be domain specific. The DM subsystem 150 also generates responses to be communicated back to the user involved in the dialog. These responses may be based upon actions initiated by the DM subsystem 150 and their results.

More specifically, the DM subsystem 150 maybe rules based, rather than including a machine learning (ML) model, and an embodiment of the DM subsystem 150 includes a dialog state tracker 152, a dialog policy subsystem 154, an execution subsystem 156, and a context stack 158. The dialog state tracker 152 of the dialog manager 150 tracks dialog states; the dialog policy subsystem 154 of the dialog manager 150 determines an interaction, or response, for the user; and the execution subsystem 156 of the dialog manager 150 executes tasks to perform the interaction. Additionally, the context stack 158 includes context information that is a record of a current dialog between the user and the dialog system 100. In some embodiments, the dialog state tracker determines an intermediate logical form from the logical form determined by the NLU subsystem 110 and further based on the context information in the context stack 158 (i.e., based on the context of the existing conversation); the dialog policy subsystem 154 communicates with the execution subsystem 156 to execute the intermediate logical form, and the dialog policy subsystem 154 determines an output dialog act, which can be represented as an output logical form, that is based on the execution result and acts a response to the user.

The NLG subsystem 118 is configured to generate natural language texts corresponding to the responses generated by the DM subsystem 150. The texts may be generated in a form that enables them to be converted to speech by the TTS subsystem 120. The TTS subsystem 120 receives the texts from the NLG subsystem 118 and converts each of them to speech audio.

In some embodiments of the dialog system 100, such as those suitable for use on a standalone computing device, the NLG subsystem 118 is template based. For instance, the NLG subsystem 118 may translate dialog acts (i.e., responses) produced by the DM subsystem 150 into texts that the TTS subsystem 120 can convert to audio data. Because some embodiments of the DM subsystem 150 are domain specific, a limited set of response types are possible for responses from the DM subsystem 150. Thus, the NLG subsystem 118 may use a rules-based approach to map a response to a template, and the NLG subsystem 118 can then populate the template with information in the response.

To enable to the dialog system 100 to be suitable for use in a standalone computing device, some embodiments include a UIgenerator 119. In an embodiment of the dialog system 100 that includes a UIgenerator 119, the output from the NLG subsystem 118 may be provided to the UI generator 119 or the TTS subsystem 120, or both; however, if no UIgenerator 119 is being used, then the output from NLG subsystem 118 may be provided to the TTS subsystem 120. Generally, the UI generator 119 enables the dialog system 100 to work with whatever output devices are available, for instance, in the case where the dialog system 100 is operating on a standalone computing device without peripherals or without a network connection. For example, the standalone computing device may lack a speaker capable of outputting speech, and in that case, the dialog system 100 may provide textual output to a display screen or may provide some other form of output. As such, the UIgenerator 119 may be responsible for updating one or more user interfaces being used by the dialog system 100. The characteristics of such a user interface depend on the hardware available for use by the dialog system 100. The UI generator 119 detects such hardware and determines how to translate the output of the NLG subsystem 118 (i.e., the output of the DM manager 150 as translated into natural language) into a form that can be presented by way of the user interface on an available output device. If the dialog system 100 has access to a speech output component 124, then an embodiment of the UIgenerator 119 may receive output from the DM subsystem 150 and may simply forward that output to the TTS subsystem 120.

In some embodiments, the TTS subsystem 120 is lightweight and fast enough to run on an embedded device or other standalone device. Thus, some embodiments of the dialog system 100 use a commercial embedded TTS solution targeted at embedded devices.

The speech audio determined by the TTS subsystem 120 may be output as audio data to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100. The speech output component 124 may output the speech audio in the form of speech output 122 and may thereby provide an audible response to a user.

As described above, the various subsystems of the dialog system 100 working in cooperation provide the functionality that enables the dialog system 100 to receive speech inputs 104 and to respond using speech outputs 122 and, thereby, to maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

As described above, some aspects of the dialog system 100 are configured to be operable on a standalone device such that neither peripherals nor a network connection is needed. To that end, the dialog system 100 may be configured to be stored in a relatively small amount of space and, further, maybe tailored for a certain domain (i.e., a certain set of related tasks). For instance, certain subsystems of the dialog system 100 that might conventionally be implemented as ML models may instead be rule based as described herein or may learn to return output that fits into the applicable domain, thus reducing the amount of information that needs to be learned.

Figure 2:
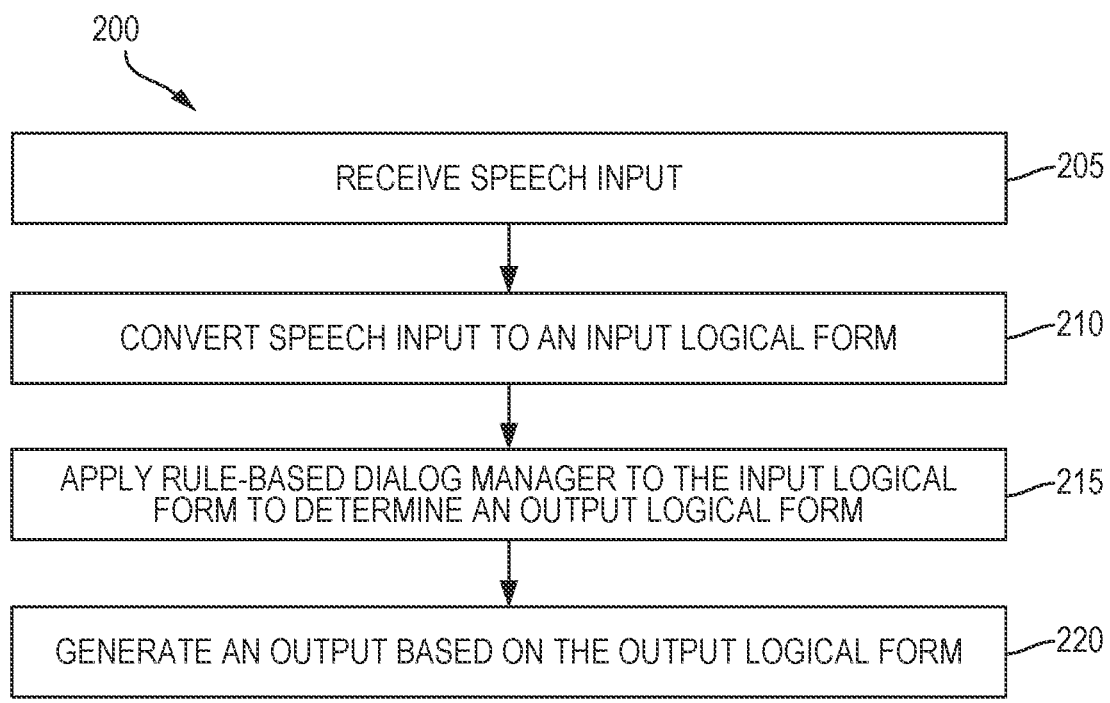
FIG. 2 is a diagram of an example of a method for utilizing the dialog system to provide a dialog with a user, according to some embodiments described herein.

FIG. 2 is a diagram of an example of a method 200 for utilizing a dialog system 100, such as that shown and described above, to provide a dialog with a user, according to some embodiments described herein. In some embodiments, this method 200 is performed by the dialog system 100 running on a computing device (e.g., a standalone computing device); however.

The method 200 depicted in FIG. 2, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 200 is intended to be illustrative and non-limiting. Although FIG. 2 depicts various activities occurring in a particular sequence or order, this is not intended to be limiting. In certain embodiments, for instance, the activities may be performed in a different order, or one or more activities of the method 200 may be performed in parallel. In certain embodiments, the method 200 may be performed by the dialog system 100.

Figure 3:
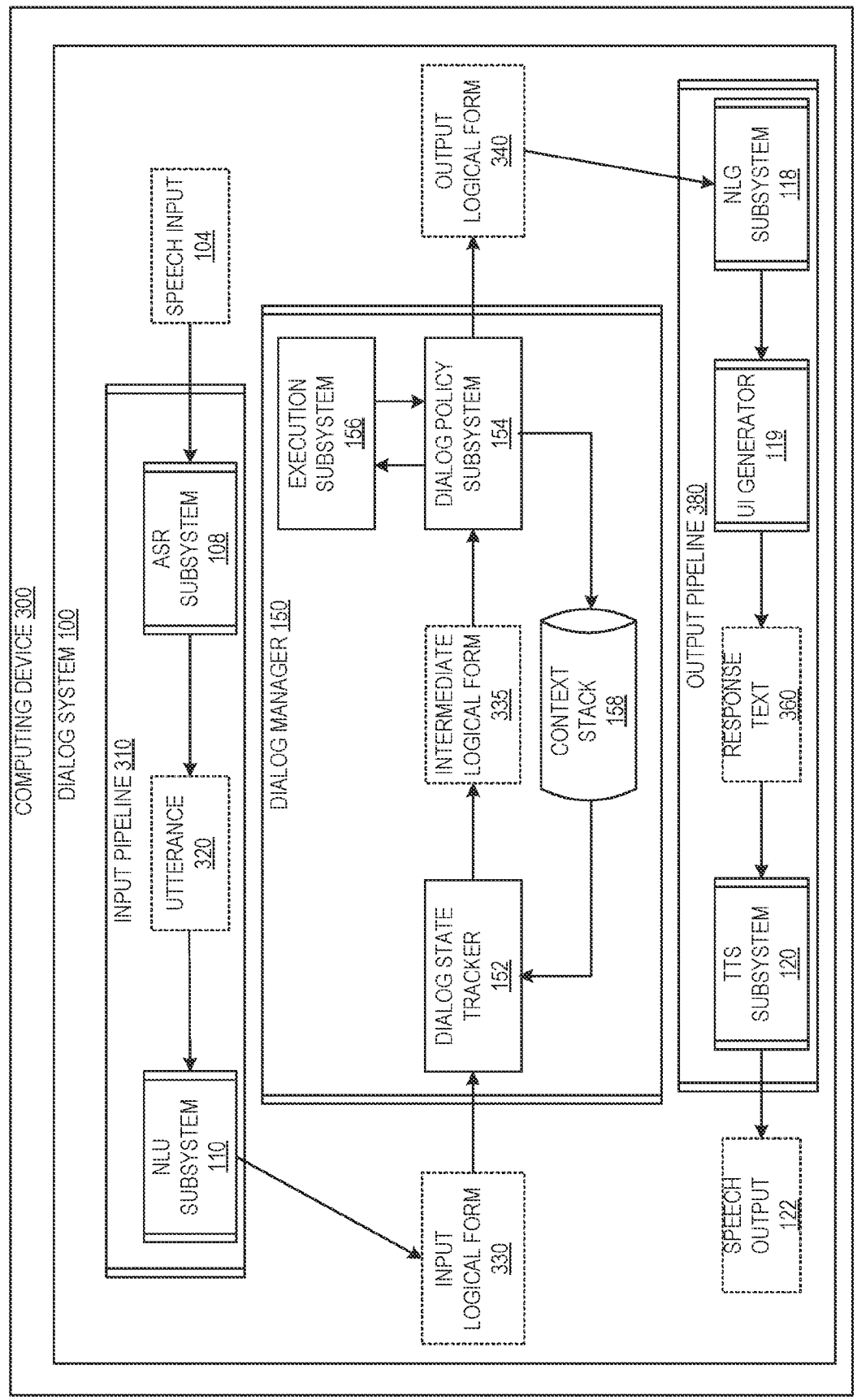
FIG. 3 is a diagram of the dialog system implemented on a computing device, such as a standalone computing device, according to some embodiments described herein.

FIG. 2 will be described below with reference to FIG. 3. FIG. 3 is a diagram of the dialog system 100 implemented on a computing device 300, specifically a standalone computing device 300, according to some embodiments described herein. As shown in FIG. 3, in this example, the various subsystems of the dialog system 100 are all incorporated into the computing device 300 such that the computing device 300 is a standalone device for implementing the dialog system 100. For instance, the computing device 300 need not have or utilize peripherals or a network connection to use the dialog system 100 to process speech input 104 and provide a speech output 122. The dialog system 100 described herein may be suitable for implementation in standalone computing device 300, such as the computing device 300 shown. This computing device 300 may be, for example, a smartphone, a tablet, a notebook computer, an embedded device, a smart appliance or other smart device, an Internet of Things (IoT) device, or one of various other device types.

FIG. 3 illustrates a non-limiting example of the dialog system 100, and other implementations may be implemented as a combination of computing devices in communication with one another. In alternative embodiments, the dialog system 100 need not be limited to a running on a standalone computing device. In such embodiments, the dialog system 100 may still benefit from the reduction in computing resources (e.g., computer storage) required as compared to conventional dialog systems In one non-limiting example, the dialog system 100 runs on a smart alarm clock, which is a standalone embedded computing device 300. The example dialog system 100 supports features such as create alarm, delete alarm, cancel alarm, edit alarm, and snooze alarm, with attributes such as date, time, schedule, day, and name. The dialog system 100 also provides more advanced features such as conditionals, negation, and multi-intent requests. The example dialog system 100 handles a variety of dialog use cases, such as making requests for confirmation, making requests for additional information, providing suggestions, and informing the user of invalid values. In this example, the dialog system 100 is implemented on a computing device 300 with a central processing unit (CPU) having a 1.4 GHz clock rate and with 1 GB of random-access memory (RAM). The ML model size of the semantic parser subsystem 114 is 2.5 MB and consumes 15.6 MB of memory during run time, and the model size of the NER subsystem 112 is 0.4 MB and consumes 0.4 MB of memory at run time respectively. The model size of the ASR subsystem 108 is 7.9 MB. The example dialog system 100 is able to be stored on and is able to operate on the computing device 300 despite the limited resources of the computing device 300. Various other implementations are possible and are within the scope of this disclosure.

As shown in FIG. 2, at block 205, the dialog system 100 receives speech input 104. For instance, the speech input 104 may be spoken by a user and received at the dialog system 100 by way of a speech input component 105, such as a microphone.

At block 210, the dialog system 100 converts the speech input 104 received at block 205 into an input logical form 330. For instance, one or more subsystems of the dialog system 100 may participate in translating the speech input 104 into an input logical form. As shown in FIG. 3, some embodiments of the dialog system 100 include an input pipeline 310, the dialog manager 150, and an output pipeline 380. Generally, the input pipeline 310 includes one or more subsystems of the dialog system 100 that together translate the speech input 104 into an input logical form 330 useable by the dialog manager 150. An example of the input pipeline includes the ASR subsystem 108, which translates the speech input 104 into an utterance 320, and the NLU subsystem 110, which translates the utterance into the input logical form 330. Various other implementations are possible and are within the scope of this disclosure.

Logical forms, such as the input logical form 330, the intermediate logical form 335, and the output logical form 340, are a structured representation of the semantics of natural language expressions. Logical forms can include substructures that identify the topics, actions, attributes, and values conveyed by natural language expressions, such that equivalent natural language expressions have identical logical forms and such that logical forms are amenable to processing by a computing device. Logical forms may be derived from natural language expressions, and natural language expressions may be constructed fromlogical forms, making logical forms a suitable basis for representing both inputs to and outputs from a dialog system 100. Various types of logical forms fit this definition and are therefore suitable for use according to some embodiments.

Some embodiments of the dialog system 100 utilize a non-conventional logical form for the input logical form 330 as well as the intermediate logical form 335 and the output logical form 340, which will be described below. Conventionally, a logical form uses a representation that involves intents plus slots (i.e., parameters); however, this representation does not express complicated scenarios involving conditionals, nested structures, multi-intents, and quantifier scope, particularly in a manner that can be processed efficiently using relatively small subsystems in the dialog system 100 as in some embodiments.

Thus, some embodiments of the dialog system 100 use logical forms in a data-interchange format; for instance, the logical forms used in the dialog system 100 are JavaScript Object Notation (JSON) objects. The logical forms used by some embodiments of the dialog system 100 have attribute-value structures whose organization is motivated by CUED dialog acts. Additionally, the logical forms used in some embodiments have a bipartite structure including topic and action attributes. The topicidentifies one or more entities under discussion, and the action specifies what the user requests the system to do with the one or more entities. The types of logical forms used by such embodiments can be referred to as Topic-Action Attribute-Value Logical Forms (TAVLFs).

In one example, the speech input 104 provided to a dialog system 100 operating in a standalone computing device 300 that is a smart alarm clock might be "move my workout alarm tomorrow one hour earlier." In this example, the sub systems in the input pipeline 310 translate this speech input 104 into the following input logical form 330: {"topic": {"name": "workout" }, "action": {"edit": {"offset_direction": "earlier", "offset_time": "1 hour"}}}. The topic attribute identifies calendar entries that satisfy {"name": "workout"} (i.e., calendar entries named "workout"), and the action attribute specifies what the dialog system 100 should do to such a calendar entry, which, in this case, is to apply the edit action with arguments indicating moving the calendar entry by an offset of one hour earlier.

In contrast to conventional logical forms, TAVLFs can express complicated use cases such as multi-intent requests, nested finds, conditional requests, and quantifiers and superlatives. Additionally, the bipartite separation into topic and action can enable the dialog system 100, specifically the dialog manager 150, to efficiently and effectively handle follow-up requests, as described further below. As a result, even with limited memory and computational power, as might be the case in a standalone computing device 300, embodiments of the dialog system 100 are able to handle complicated utterances 320, which may be based on based on complicated speech input 104.

As described above, the semantic parser 114 of the NLU subsystem 110 determines a logical form, specifically the input logical form 330, corresponding to an utterance 320, which may correspond to the speech input 104. As mentioned above, the semantic parser 114 may be a neural network such as a seq2seq model. In some embodiments, such a semantic parser 114 is trained to map utterances 320 to logical forms that are TAVLFs or some other representations suitable for embodiments of the dialog system 100 described herein. To this end, training may involve using a set of utterances 320 as the training input to the semantic parser 114 and using a set of corresponding logical forms as the expected output of the semantic parser 114. The weights of nodes in the semantic parser 114 are updated to minimize the error of the actual output of the semantic parser during training as compared to the corresponding logical forms. Using logical forms that are TAVLFs causes the semantic parser 114 to learn to map utterances 320 to corresponding logical forms that are TAVLFs. Thus, an embodiment of the semantic parser 114 is configured to generate a TAVLF as the input logical form 330.

At block 215 of FIG. 2, the dialog system 100 determines an output logical form 340 from the input logical form 330 determined at block 210. Specifically, in some embodiments, this task is performed by the DM subsystem 150, also referred to as the dialog manager 150, of the dialog system 100.

Generally, an embodiment of the dialog manager 150 is responsible for dialog state tracking, task execution, and determining an interaction with the user. In some embodiments, the dialog manager 150 is rule based rather than, or in addition to, being implemented as an ML model. For instance, the dialog state tracker 152 of the dialog manager 150 tracks dialog states, the dialog policy subsystem 154 of the dialog manager 150 determines an interaction, or response, for the user, and the execution subsystem 156 of the dialog manager 150 executes tasks to perform the interaction. Additionally, some embodiments of the dialog manager 150 include (i.e., have access to) a context stack 158, also referred to as context data, whichis a record of a current dialog between the user and the dialog system 100. The context stack 158 includes information that enables the dialog manager 150 to put speech input 104, as translated into the input logical form 330, into the context of an existing conversation between the user and the dialog system 100.

In some embodiments, the context stack 158 includes the dialog state, including dialog acts (i.e., output from the dialog manager 150). Specifically, for instance, the context stack 158 may include one or more of the following types of information since the current dialog began: each input logical form 330, each execution result output by the execution subsystem 156, and each output logical form 340 (i.e., each dialog act) determined by the dialog manager 150. As such, the context stack 158 may essentially maintain a history of the current conversation. In some embodiments, when the dialog manager 150 deems that a received input logical form 330 begins a new dialog, in contrast to being deemed a follow-up, the dialog manager 150 may reset (e.g., erase) the context stack 158, thereby indicating that the this is a new conversation with no existing context.

The dialog state tracker 152 may receive the input logical form 330 (e.g., from the NLU subsystem 110) and may combine the input logical form 330 with context information from the context stack 158 to determine an intermediate logical form 335. In some embodiments, the intermediate logical form 335 represents the user input (e.g., the speech input 104) as translated into the input logical form 330 and, further, as placed in the context of an existing conversation, if any, as represented by the context stack 158. For instance, as compared to the input logical form 330, the intermediate logical form 335 can include additional information that was apparent in the context of the conversation although not explicitly stated in the input logical form 330. Some embodiments described herein use a rules-based dialog state tracker 152 because a rules-based dialog state tracker 152 is easy to implement, as compared to using an ML model, requires no training data, is fast at run time, and enables incorporation of domain-specific information into the rules being followed by the dialog state tracker 152.

In one example, the user may provide to the dialog system 100 a first speech input 104 asking to move a workout alarm forward by one hour, and the dialog system 100 may thus translate this speech input into an input logical form 330 and execute the task of moving the workout alarm as requested. In this case, the output logical form 340 may indicate that the workout alarm was moved as requested. The user may then provide a second speech input 104 asking the dialog system 100 what time the alarm is scheduled. In this case, the dialog system 100 may be associated with multiple alarms, and the second speech input 104 does not identify which alarm the user means. However, through checking the context stack 158, the dialog state tracker 152 can determine that the alarm is most likely the workout alarm, and as such, the dialog state tracker 152 can determine an intermediate logical form that includes the information from the input logical form 330 but also includes the name of the alarm (i.e., "workout alarm). The dialog policy subsystem 154 can then coordinate with the execution subsystem 156 to determine the schedule time of the workout alarm, and the dialog policy subsystem 154 can generate an output logical form indicating the current scheduled time for the workout alarm. Thus, the dialog state tracker 152 may utilize the context stack to add context to the input logical form 330 and thereby generate the intermediate logical form 335 as a representation of the input logical form 330 combined with that context.

In some embodiments, the dialog policy subsystem 154 and the execution subsystem 156 of the dialog manager 150 work closely together. However, in an example embodiment, the dialog policy subsystem 154 is domain independent while the execution subsystem 156 is domain specific; thus, the separation of these two components of the dialog manager 150 can make it easier to port the dialog policy subsystem 154 from one dialog system 100 to another regardless of domain. The dialog policy subsystem 154 may take the intermediate logical form 335 as input and may pass the intermediate logical form 335 to the execution subsystem 156; additionally or alternatively, the dialog state tracker 152 may pass the intermediate logical form 335 directly to the execution subsystem 156. The execution subsystem 156 may execute the intermediate logical form 335 and may determine an execution result (i.e., a result of that execution). The dialog policy subsystem 154 may determine an output logical form 340 based on the execution result.

The execution subsystem 156 may be responsible for the actual execution of a user request, as represented by the intermediate logical form 335. Various implementations for the execution subsystem 156 are possible and are within the scope of this disclosure. In some embodiments, the execution subsystem 156 converts, or translates, the intermediate logical form 335 to a query, such as a Structured Query Language (SQL) query, representing the intermediate logical form 335. The execution subsystem 156 may implement a rules-based translation using a set of translation rules designed for the types of tasks allowed in the applicable domain. The execution sub system 156 then executes the intermediate logical form 335 by executing the query representing the intermediate logical form 335 against a database. As discussed above, the dialog system 100 may be tailored to a specific domain, and the database includes one or more tables maintaining information related to that domain. For instance, in the example where the dialog system 100 runs in a smart alarm clock, the database may include a table including a row for each alarm, where that row includes a name, a time or other schedule, audio to play as an alarm sound, a history of when the alarm was previously activates, or other information about the respective alarm. In some embodiments, the domain allows for a specific set of types of tasks, and the database includes the information needed to execute such tasks. Additionally, as needed, the execution subsystem 156 may interact with an entity resolver, such as an entity resolver integrated with the execution subsystem 156, a distinct entity resolver, or the NER subsystem 112 of the NLU subsystem 110, to identify one or more named entities in the intermediate logical form 335 if such a named entity is not exactly matched in the database. For example, the entity resolver could recognize that the named entity "7 pm" in the intermediate logical form 335 is equivalent to the time "19:00" in the database. Thus, in some embodiments, executing the query against the database is sufficient for executing a user request in the applicable domain. The database may return a query result to the execution subsystem 156, and the execution subsystem 156 may return an execution result to the dialog policy subsystem 154.

The execution result may be the same as, or based on, the query result. In some embodiments, because the execution subsystem 156 is domain-specific, the execution subsystem 156 may utilize domain-specific rules to map the query result to a more general execution result that can be understood by the dialog policy subsystem 154, which may be domain-independent. The execution result may by one of a limited set of execution results available for selection by the execution subsystem 156. For example, TABLE 1, which appears below, indicates a set of execution results possible in a dialog system 100 for a smart alarm clock and further provides a description of each such execution result:

| EXECUTION RESULT | DESCRIPTION |
| --- | --- |
| Execution success | Execution finishes successfully. |
| Expect zero, got more | Execution expects no entity but got more, for instance when attempt to create a database table entry that already exists (e.g., adding an alarm with an alarm name already in use). |
| Expect one, got more | Execution expects exactly one entity but got more, for instance when attempting to edit an alarm identified by name but finding multiple alarms with the name. |
| Expect at least one, got zero | The value is not found, for instance when seeking an alarm by name when such alarm exists. |
| Invalid values | The value is invalid, for instance when attempting to create an alarm scheduled for a past time. |
| Missing attributes | A required attribute is missing, for instance when attempting to create an alarm without specifying a time. |
| Awaiting confirmation | Execution pauses to wait for confirmation from the user for a critical action, such as purchase or delete. |
| Execution fail | Execution failed for an unknown reason. This is useful for fallback policy. |

In some embodiments, the dialog policy subsystem 154 uses the execution result to generate the system response, also referred to as a dialog act, which is encoded in an output logical form 340. Like the dialog state tracker 152 and the execution subsystem 156, the dialog policy subsystem 154 may be rules based; however, the dialog policy subsystem 154 may be domain-independent. Due to the execution subsystem 156 returning generic (i.e., domain-independent) execution results that are not tied to any specific domain, the dialog policy subsystem 154 need not be aware of the domain to interpret and utilize an execution result received. This can enable the dialog policy subsystem 154 to be ported across dialog systems 100 applicable to various domains. Based on an application of a set of rules to the execution result, an embodiment of the dialog policy subsystem 154 determines howto respond to the user (i.e., determines a dialog act) or, more specifically, how to convey the information in the execution result. The dialog policy subsystem 154 may construct an output logical form 340 corresponding to the execution result, such that the output logical form 340 may convey the information in the execution result. For instance, in a simplistic example, each execution result maps to a specific output logical form 340 according to the set of rules followed by the dialog policy subsystem 154.

As shown in the above table, TABLE 1, one of the possible execution results (e.g., "execution fail") may indicate that execution failed for an unknown reason. This execution result may trigger the dialog policy subsystem 154 to apply a set of fallback dialog policies. The fallback dialog policies may seek to gather more information so as to effectively respond to the user input (e.g., the speech input 104). In some embodiments, the ARS subsystem 108 or the NLU subsystem 110, or both, may output respective confidence scores. For instance, the ASR subsystem 108 may determine a confidence score associated with the utterance 320 to indicate a likelihood of accuracy of the utterance 320 as compared to the speech input 104, and the NLU subsystem 110 may determine a confidence score associated with the input logical form 330 to indicate a likelihood of accuracy of the input logical form 330 as compared to the utterance. If execution failed for an unknown reason, as indicated by the execution result, the dialog policy subsystem 154 may construct an output logical form that requests more information from the user.

The specific information requested by the dialog policy subsystem 154 when the fallback dialog policies are triggered may be based on, for instance, a comparison of the confidence scores of the utterance 320 and input logical form 330 or may be based on the use of one or more confidence thresholds. In one example, if the confidence score of the utterance 320 is lower than the confidence score of the input logical form 330, then the dialog policy subsystem 154 may construct an output logical form 340 asking the user to speak more clearly, but if the confidence score of the input logical form 330 is lower than the confidence score of the utterance, then the dialog policy subsystem 154 may construct an output logical form 340 asking the user to rephrase the speech input 104. In another example, if the confidence score of the utterance 320 is below a threshold, the dialog policy subsystem 154 may construct an output logical form 340 asking the userto speak more clearly, and if the confidence score of the input logical form 330 is below a threshold, the dialog policy subsystem 154 may construct an output logical form 340 asking the userto rephrase the speech input 104.

At block 220, the dialog system 100 generates an output based on the output logical form 340 determined at block 215. One or more subsystems are included in an output pipeline 380 that converts the output logical form 340 into an output, such as a speech output 122 or other output (e.g., text) appropriate for the computing device 300 running the dialog system 100. As shown in FIG. 3, an example of the output pipeline 380 includes the NLG subsystem 118, which translates the output logical form 340 to a response text 360 in natural language; the UIgenerator 119, which determines a form of the output from the dialog system 100; and the TTS subsystem 120, which determines audio that can be provided as speech output 122. Another example of the output pipeline 380 excludes the UI generator 119 but includes the NLG subsystem 118 and the TTS subsystem 120. Various other implementations are possible and are within the scope of this disclosure.

As part of the output pipeline 380, the NLG subsystem 118 may convert the output logical form 340 to a response text. In some embodiments of the dialog system 100, such as those suitable for use on a standalone computing device, the NLG subsystem 118 is rules based and, more specifically, template based. For instance, the NLG subsystem 118 may translates dialog acts (i.e., responses) produced by the dialog manager 150 into text that is input into the TTS subsystem 120. As described above, in some embodiments, a limited set of output logical forms 340 are possible given the limited set of execution results that are possible. The NLG subsystem 118 may use a rules-based approach to map the output logical form 340 to a corresponding template given a limited set of available templates. For instance, the NLG subsystem 118 may use a hash function for efficient template retrieval to map the output logical form 340 to the appropriate template. If multiple templates are found when applying the hash function, some embodiments use a best-match approach to select a template from those retrieved by the hash function, where, for instance, a best match is determined based on matching the number and type of attributes in the dialog act to the number and type of attributes in the retrieved template. In some embodiments, as in the example of FIG. 3, the response text 360 output by the NLG subsystem 118 may then be translated into audio data by the TTS subsystem 120, and that audio data may be output as speech output 122.

Figure 4:
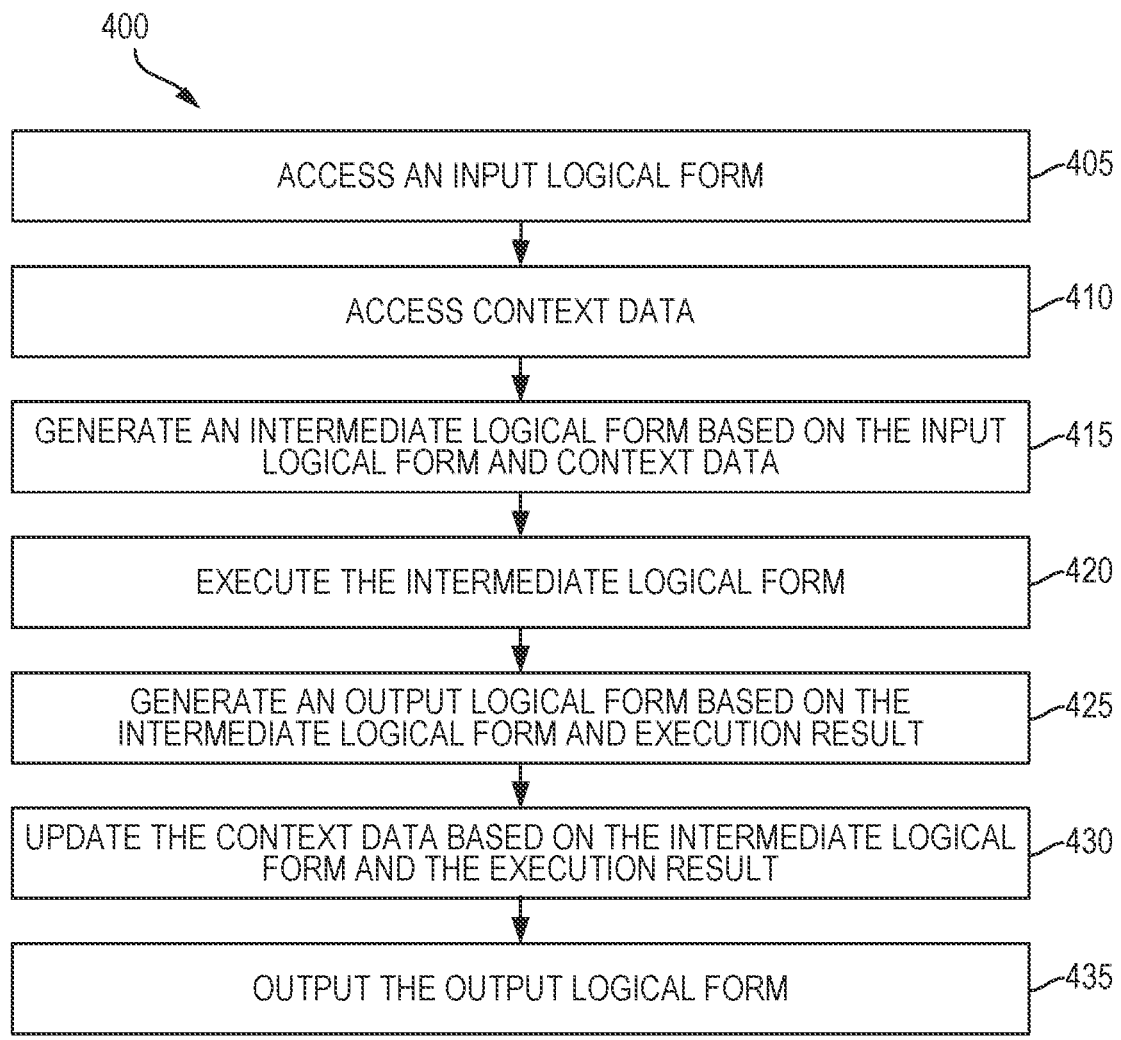
FIG. 4 is an example of a method performed by a dialog manager of the dialog system to respond to an input logical form and thus to provide an output logical form, according to some embodiments described herein.

FIG. 4 is an example of a method 400 performed by the dialog manager 150 to respond to the input logical form 330 and thus to provide an output logical form 340, according to some embodiments described herein. As discussed above, in some embodiments, the input logical form 330 is received by the dialog manager 150 from the NLU subsystem 110, and the output logical form 340 generated by the dialog manager 150 is provided as input to the NLG subsystem 118. Thus, the dialog manager 150 does the work of determining how to respond to the speech input 104 as translated into input logical form 330. To that end, the dialog manager 150 may perform this method 400 or similar; specifically, this method 400 or similar may be performed by the dialog manager 150 to implement block 215 of the above method 200 of providing a dialog.

The method 400 depicted in FIG. 4, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 400 is intended to be illustrative and non-limiting. Although FIG. 4 depicts various activities occurring in a particular sequence or order, this is not intended to be limiting. In certain embodiments, for instance, the activities may be performed in a different order, or one or more activities of the method 400 may be performed in parallel. In certain embodiments, the method 400 may be performed by the dialog manager 150.

At block 405, the dialog manager 150 accesses an input logical form 330. As described above, the input logical form 330 may be a translation of the utterance 320, which may be a translation of speech input 104 provided by a user. Thus, the input logical form 330 may be representations of user input.

At block 410, the dialog manager 150 accesses context information in the context stack 158. As described above, an embodiment of the context stack 158 includes information about the current conversation. For instance, the context stack 158 may include each input logical form 330 and each execution result or output logical form 340 that have occurred in the conversation. A conversation can be deemed to have ended, for example, if the input logical form 330 is not deemed a follow-up, as described further below with reference to FIG. 5. However, until a conversation is deemed to have ended, the context stack can be used to add context to the input logical form 330.

At block 415, the dialog manager 150 generates an intermediate logical form 335 from the input logical form 330 accessed at block 405 and the context data accessed at block 410. For instance, the dialog manager 150 may add information from the context stack 158 to fill in any missing details in the input logical form, as described further below with reference to FIG. 5. Thus, the intermediate logical form 335 represents the input logical form 330 put into the context of an existing conversation (i.e., an existing dialog between the user and the dialog system 100).

At block 420, the dialog manager 150 executes the intermediate logical form 335 generated at block 415. As described above, in some embodiments, the dialog manager 150 executes the intermediate logical form 335 by converting the intermediate logical form 335 to a query and executing the query against a database. Executing the intermediate logical form 335 may yield an execution result, which maybe output by the database responsive to the query or which may be determined based on output from the database.

At block 425, the dialog manager 150 generates an output logical form 340 based on the execution result from block 420 and, in some embodiments, further based on the intermediate logical form 335 determined at block 415. For instance, the dialog manager 150 may map the execution result to an output logical form 340. In some embodiments, if it desired to provide a more specific output to the user, the dialog manager 150 may include in the output logical form 340 additional information from the intermediate logical form 335. For instance, in the case where the dialog system 100 runs as part of a smart alarm clock and the user input is related to an alarm having certain name, the name of the alarm may be extracted from the intermediate logical form 335 for inclusion in the output logical form 340.

At block 430, the dialog manager 150 updates the context data in the context stack 158 based on the intermediate logical form 335 from block 415 and the execution result from block 420. For instance, the input logical form 330 and either the execution result or the output logical form 340, or both, may be added to the context stack 158 such that the context stack 158 is updated according to the current state of the conversation.

At block 435, the dialog manager 150 outputs the output logical form 340. As described above, the output logical form 340 is input into the NLG subsystem 118. As such, the subsystems in the output pipeline 380 can provide an output to the user, such as in the form of speech output 122.

Figure 5:
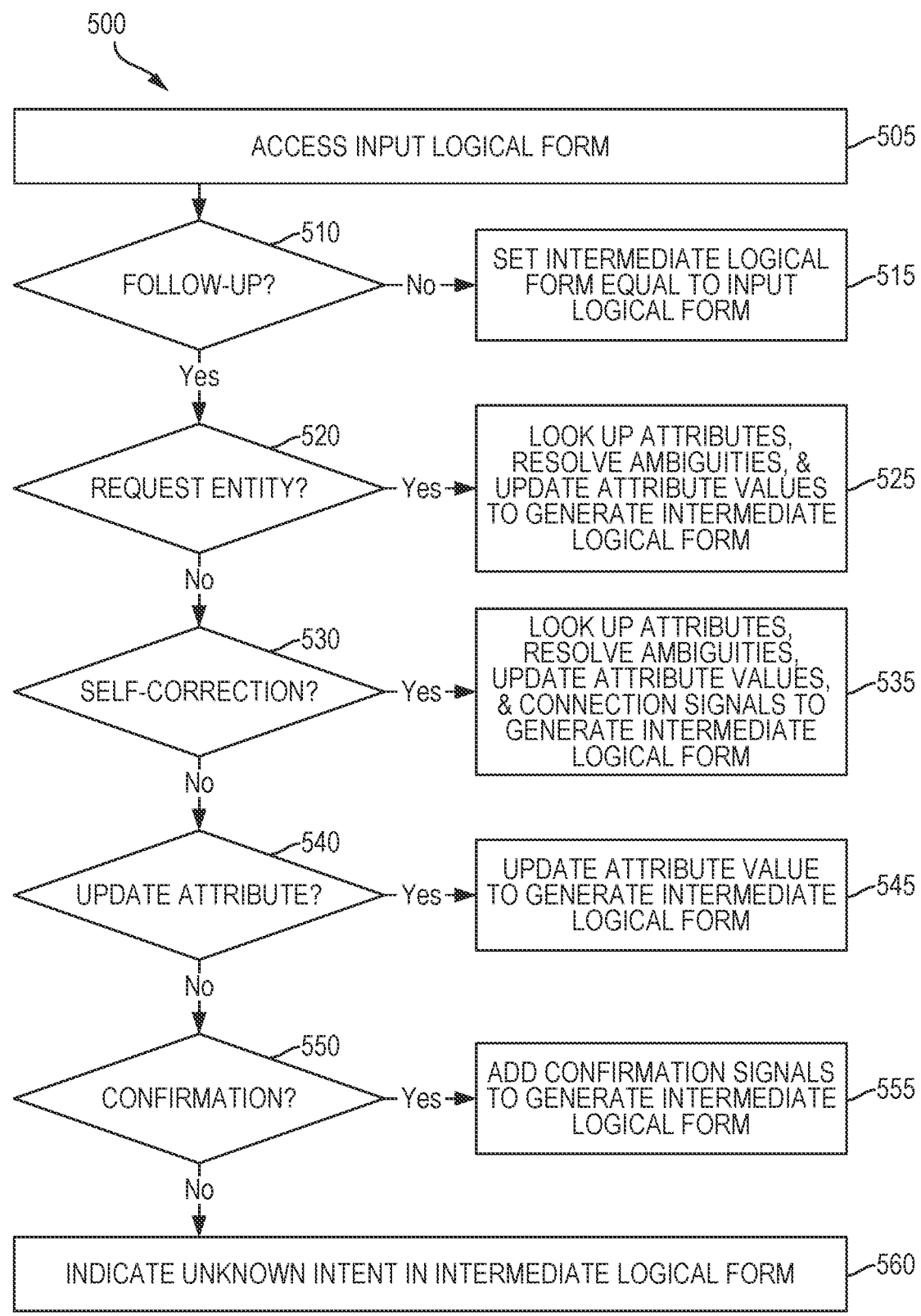
FIG. 5 is an example of a method performed by the dialog manager to determine an intermediate logical form from the input logical form, according to some embodiments described herein.

FIG. 5 is an example of a method 500 performed by the dialog manager 150 to determine an intermediate logical form 335 from an input logical form, and thus to convert an input logical form 330 to an intermediate logical form 335, according to some embodiments described herein. The dialog manager 150, specifically the dialog state tracker 152, may perform this method 500 or similar to implement block 415 of the above method 400 of determining a response to the input logical form 330. Specifically, FIG. 5 provides an example of the organization of the rules based dialog state tracker 152, which may determine intermediate logical forms 335 from input logical forms 330 and the context stack 158. Generally, given an input logical form 330, an embodiment of the dialog state tracker 152 determines whether the input logical form 330 represents a follow-up user input or a root user input (i.e., not a follow-up). If the user input is a root user input, the dialog state tracker 152 may reset the context stack 158; otherwise, the dialog state tracker 152 may determine the type of follow-up represented by the input logical form 330 and may incorporate contextual information into the input logical form 330 to construct the intermediate logical form 335 according to the type of follow-up.

The method 500 depicted in FIG. 5, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 500 is intended to be illustrative and non-limiting. Although FIG. 5 depicts various activities occurring in a particular sequence or order, this is not intended to be limiting. In certain embodiments, for instance, the activities may be performed in a different order, or one or more activities of the method 500 may be performed in parallel. In certain embodiments, the method 500 may be performed by the dialog manager 150.

At block 505, the dialog state tracker 152 accesses an input logical form 330. For instance, the input logical form 330 is provided to the dialog state tracker 152 by the NLU subsystem 110. The input logical form 330 may be a representation of use input (e.g., speech input 104).

At decision block 510, the dialog state tracker 152 determines whether the input logical form 330 is a follow-up. In some embodiments, if the input logical form 330 represents follow-up user input, then the NLU subsystem 110 constructs an input logical form 330 (e.g., a TAVLF) that explicitly indicates this. Thus, the dialog state tracker 152 may use a rules-based approach in which the dialog state tracker 152 identifies the input logical form 330 as a follow-up if and only if the input logical form 330 explicitly indicates that it is a follow-up. If the dialog state tracker 152 determines that the input logical form 330 is not a follow-up, then the method 500 proceeds to block 515, where the dialog state tracker 152 sets the intermediate logical form 335 equal to the input logical form 330. However, if the input logical form 330 is deemed a follow-up, then the method 500 skips ahead to decision block 520.

At decision block 520, the dialog state tracker 152 determines whether the input logical form 330 provides a requested entity (i.e., an entity that was previous requested by the dialog system 100). In some embodiments, if the user input is a requested input, the NLU subsystem 110 constructs an input logical form 330 (e.g., a TAVLF) that explicitly indicates that an entity is being provided. For instance, an example of such an input logical form 330 represented as a TAVLF is as follows: {"action": {"follow_up": {"entity": "8 am"}}}. In this particular example, the user asked the dialog system 100 to wake the user up tomorrow, and the dialog system 100 requested a time for this task. In response to the request, the user provided a user input that was translated into this example input logical form 330. If the dialog state tracker 152 determines that the input logical form 330 is a requested entity, then the method proceeds to block 525. At block 525, the dialog manager 150 may look up attributes to which the entity applies, such as by searching for attributes in the context stack 158, and may thus construct the intermediate logical form 335 based on the resolution of ambiguities given the entity provided. However, if the input logical form 330 is deemed not to be a requested entity, then the method 500 skips ahead to decision block 530.

At decision block 530, the dialog state tracker 152 determines whether the input logical form 330 is a self-correction. In some embodiments, if the input logical form 330 represents self-correcting user input (i.e., a self-correction), then the NLU subsystem 110 constructs an input logical form 330 (e.g., a TAVLF) that explicitly indicates this. An example of such an input logical form 330 represented as a TAVLF is as follows: {"action": {"follow_up": {"entity": "9 am", "self_correction": true}}}. In this specific example, the user is changing a time (e.g., of an alarm previously created) to 9 am. In some embodiments, the dialog state tracker 152 may use a rules-based approach in which the dialog state tracker 152 identifies the input logical form 330 as a self-correction if and only if the input logical form 330 explicitly indicates that it is a self-correction, because the NLU subsystem 110 would provide such an indication. If the dialog state tracker 152 determines that the input logical form 330 is a self-correction, then the method 500 proceeds to block 535, where the dialog state tracker 152 looks up attributes (e.g., in the context stack 158) to resolve ambiguities and, as a result, can update attribute values and connection signals in the input logical form 330 when constructing the intermediate logical form 335. However, if the inputlogical form 330 is deemed not to be a self-correction, then the method 500 skips ahead to decision block 540.

At decision block 540, the dialog state tracker 152 determines whether the input logical form 330 is a request to update an attribute. In some embodiments, if the input logical form 330 is requesting for an attribute to be updated, then the NLU subsystem 110 constructs an input logical form 330 (e.g., a TAVLF) that explicitly indicates that an attribute is being updated. An example of such an input logical form 330 represented as a TAVLF is as follows: {"action" : {"follow_up": {"attribute": {"name": "meeting with Julie"}}}}. In this example, the user previously created an alarm, and is now following up to provide a name for that alarm. In some embodiments, the dialog state tracker 152 may use a rules-based approach in which the dialog state tracker 152 identifies the input logical form 330 as a request to update an attribute if and only if the input logical form 330 explicitly indicates that an attribute is being updated, because the NLU subsystem 110 would provide such indication. If the dialog state tracker 152 determines that the input logical form 330 is a request to update an attribute, then the method 500 proceeds to block 545, where the dialog state tracker 152 looks up attributes (e.g., in the context stack 158) to determine which attribute is being updated. As such, the dialog state tracker 152 may construct an output logical form 340 that identifies the attribute and the value to which the attribute is to be updated. However, if the input logical form 330 is deemed not to be a request to update an attribute, then the method 500 skips ahead to decision block 550.

At decision block 550, the dialog state tracker 152 determines whether the input logical form 330 is a confirmation (i.e., confirming that the dialog system 100 should perform some previously indicated action). In one example, the dialog state tracker 152 can determine from the context stack 158 that the user was asked for confirmation of an action. As a result, the dialog state tracker 152 may identify the input logical form as a confirmation. In another example, the NLU subsystem 110 has constructed an input logical form 330 (e.g., a TAVLF) that explicitly indicates this is a confirmation. For instance, an example of such an input logical form 330 represented as a TAVLF is as follows: {"action": {"follow_up": {"confirmation": "yes" } } }. In that case, the dialog state tracker 152 may determine that the input logical form 330 is a confirmation due to the explicit indication of such. In both of these examples, the dialog state tracker 152 can make this determination by using a rules-based approach. If the dialog state tracker 152 determines that the input logical form 330 is a confirmation, then the method 500 proceeds to block 555, where the dialog state tracker 152 constructs an intermediate logical form 335 that confirms, or rejects, the action for which confirmation was provided. However, if the input logical form 330 is deemed not to be a request to update an attribute, then the method 500 skips ahead to block 560.

At block 560, the dialog state tracker 152 was unable to identify the intent of the input logical form 330. As such, the dialog state tracker 152 may construct an intermediate logical form 335 indicating an unknown intent. As a result, the dialog policy subsystem 154 may apply a set of rules to determine how to follow up with the user given the unknown intent.

Following is an extended example of a dialog between a user and an example of a dialog system 100 implemented as part of a smart alarm clock, in which the context stack 158 is empty (i.e., in a reset state) at the beginning of the dialog. In the below example, "User" indicates an utterance 320 corresponding to user input, "LF1" indicates an input logical form 330 determined based on the utterance 320, "LF2" indicates an intermediate logical form 335 determined from the input logical form 330 and the context stack 158, "Execution" indicates output (i.e., an execution result) from the execution subsystem 156, "LF3" indicates an output logical form 340 determined based on the execution result, and "NLG" indicates a response text determined by the NLG subsystem 118:

1 User: Hey, alarm clock, wake me up tomorrow
2 LF1: {"action":{"create":{"when_day":"tomorrow"}}}
3 LF2: {"action":{"create":{"when_day":"tomorrow"}}}
4 Execution: {"execution_results": [{" action": "create", "error_code": 1, "error_attributes":["when_time"],"results":[]}]}
5 LF3: {"policy":[{"request":{"when_time": {}}}]}
6 NLG: When would you like it to ring?
7 User: 6 am please
8 LF1: {"action": {follow_up": {"entity": "6 am"}}}
9 LF2: {"action": {"create": {"when_day": "tomorrow", "when_time": "6am"}}}
10 Execution: {"execution_results": [{"action": "create", "error_code": 0, "error_attributes": [], "results": [{"id": "1", "when_date": "2020-08-29", "when_time": "06:00"}]}]}
11 LF3: {"policy": [{"inform": {"action": "create", "when_date": "2020-08-29", "when_time": "06:00"}}]}
12 NLG: Your alarm will go off at 06:00 tomorrow.

In the above example, the input logical form 330 at line 2 and the intermediate logical form 335 at line 3 are the same because this is the start of a dialog, and thus, the context stack 158 is empty. As such, the dialog state tracker 152 sets the intermediate logical form 335 equal to the input logical form 330 in some embodiments. Additionally, in this example, the execution subsystem 156 returns error code = 1, which refers to a missing attribute, at line 4. As a result, the output logical form 340 at line 5 requests the missing information, specifically a time for the alarm, and the user provides that missing information at line 7. Following this, the dialog manager 150 executes the user input with the provided attribute to set the requested alarm.

As another example, below is a more complicated dialog that includes negation and self-correction:

1 User: Hey, alarm clock, could you create alarms called feed the dog for every
weekday except Friday at 8 am
2 LF1:{"action":{"create":{"interval":"1w","name":"feedthedog","when_-day":
 ["weekdays", "~friday"], "when_time" : "8 am"}}}
3 LF2:{"action":{"create":{"interval":"1w","name":"feedthedog","when_-day":
 ["weekdays", "~friday"], "when time" : "8 am"}}}
4 Execution: {"execution_results": [{"action": "create", "error-code": 0, "error_attributes": [], "results": [{"id": "2", "interval": "1w", "name": "feed the dog",
 "when_day": "monday, tuesday, wednesday, thursday", "when_-time": "08:00"}]}]}
5 LF3: {"policy": [{"inform": {"action": "create", "interval": "1w", "name": "feed the
 dog", "when_day": "monday, tuesday, wednesday, thursday", "when_-time":
 "08:00"}}]}
6 NLG: Your weekly alarm called feed the dog will ring every Monday, Tuesday,
Wednesday, and Thursday at 08:00.
7 User: Hey, alarm clock, sorry I meant 9 am
8 LF1: {"action": {"follow_up": {"entity": "9 am", "self correction": true}}}
9 LF2:{"action":{"create":{"interval":"1w","name":"feedthedog","when_-day":
 ["weekdays", "~friday"], "when_time": "9 am", "self_correction": "true"}}}
10 Execution: {"execution_results": [{"action": "edit", "error_code": 0, "error_attributes": [], "results": [{"id": "2", "interval": " 1w", "name": "feed the dog",
 "when_day":"monday,tuesday,wednesday,thursday","when_time":"08:00",
 "when_time_new": "09:00"}]}]}
11 LF3: {"policy": [{"inform": {"action": "edit", "interval": "1w", "name": "feed the
                                                               dog", "when-day": "monday, tuesday, wednesday, thursday", "when time": "08:00",

```
            "when time new": "09:00"}}]}
12    NLG: Your recurring Monday, Tuesday, Wednesday, and Thurs-
day alarm called feed
      the dog has been moved from 08:00 to 09:00.
```

In the above example, the user performs a self-correction at line 7. At line 8, the input logical form 330 indicates that the user input is a follow-up related to the names entity "9 am." Incorporating context, at line 9, the intermediate logical form 335 indicates that this is a self-correction to change the time of the "feed the dog" alarm to "9 am." Thus, the remaining lines execute this correction and confirm the change to the user.

Figure 6:
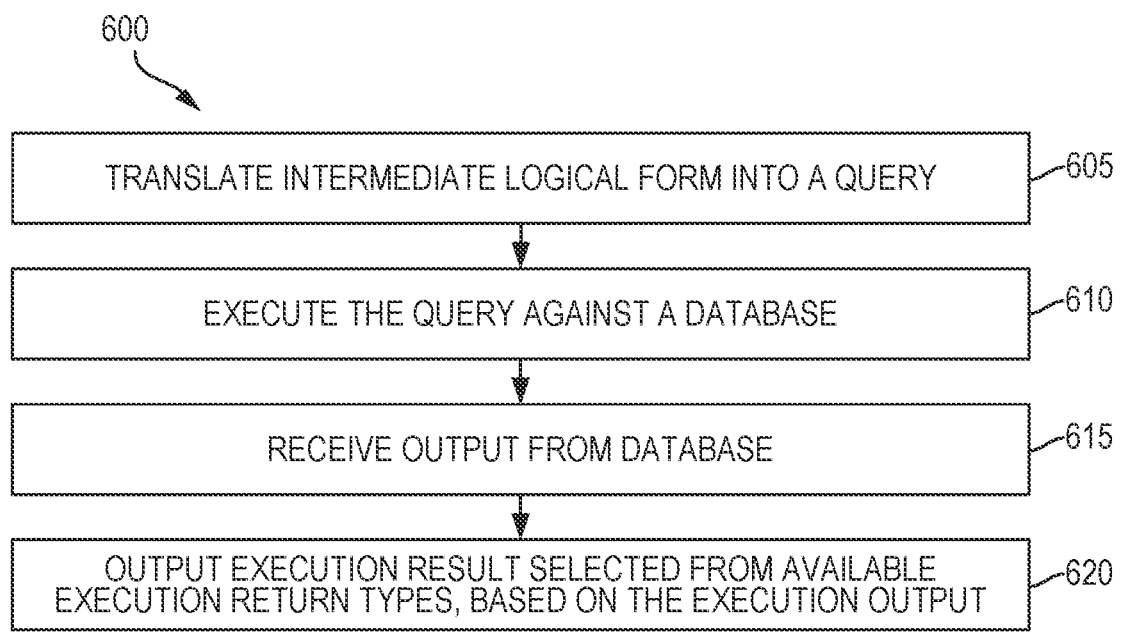
FIG. 6 is an example of a method performed by the dialog manager to execute the intermediate logical form, according to some embodiments described herein.

FIG. 6 is an example of a method 600 performed by the dialog manager 150 to execute the intermediate logical form 335 in determining a response to the input logical form 330, according to some embodiments described herein. The dialog manager 150, specifically the execution subsystem 156, may perform this method 600 or similar to implement block 420 of the above method 400 of determining a response to the input logical form 330.

The method 600 depicted in FIG. 6, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 600 is intended to be illustrative and non-limiting. Although FIG. 6 depicts various activities occurring in a particular sequence or order, this is not intended to be limiting. In certain embodiments, for instance, the activities may be performed in a different order, or one or more activities of the method 600 may be performed in parallel. In certain embodiments, the method 600 may be performed by the dialog manager 150.

At block 605, the execution subsystem 156 translates the intermediate logical form 335 into a query, such as a SQL query. Various techniques exist for implementing this translation, and one or more of such techniques may be used by the execution subsystem 156. For instance, as discussed above, an embodiment of the dialog system 100 uses logical forms represented in JSON, and thus, an existing technique for translating JSON to SQL may be used to convert the intermediate logical form to a query in some embodiments.

At block 610, the execution subsystem 156 executes the query against a database. The database may maintain information about the existing state of data that can be accessed by the dialog system. Thus, by executing the query, the execution subsystem 156 is configured to access or alter this data as indicated by the user input represented in the intermediate logical form 335.

At block 615, responsive to the execution of the query, the execution subsystem 156 receives an output from the database. For instance, the output may provide an indication of errors or may provide data, if any, fetched in response to the query.

At block 620, the execution subsystem 156 determines and outputs an execution result based on the output from the database. For instance, the execution result may be selected from a limited set of possible execution results and, further, may be selected to convey the information in the output from the database. In one example, the execution subsystem 156 maintains, or has access to, a mapping of database outputs to execution results, and the execution sub system 156 selects an execution result based on applying this mapping to the database output.

Figure 7:
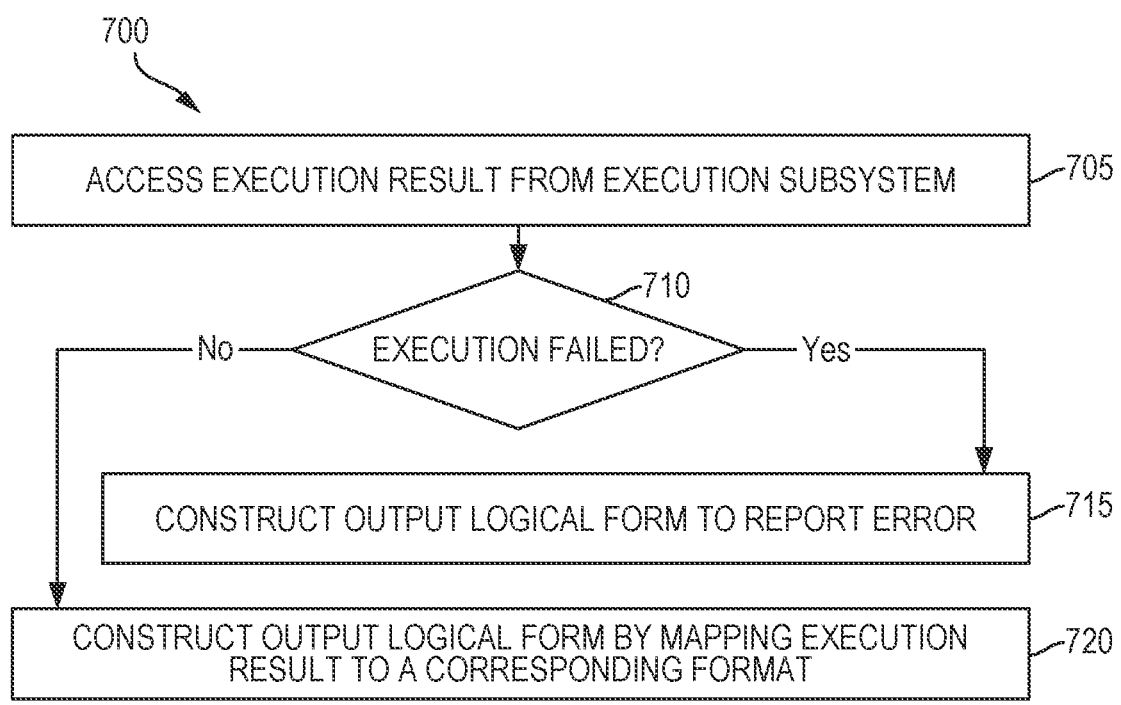
FIG. 7 is an example of a method performed by the dialog manager to generate the output logical form, according to some embodiments described herein.

FIG. 7 is an example of a method 700 performed by the dialog manager 150 to generate an output logical form 340 in determining a response to the input logical form 330, according to some embodiments described herein. The dialog manager 150, specifically the dialog policy subsystem 154, may perform this method 700 or similar to implement block 425 of the above method 400 of determining a response to the input logical form 330.

The method 700 depicted in FIG. 7, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 700 is intended to be illustrative and non-limiting. Although FIG. 7 depicts various activities occurring in a particular sequence or order, this is not intended to be limiting. In certain embodiments, for instance, the activities may be performed in a different order, or one or more activities of the method 700 may be performed in parallel. In certain embodiments, the method 700 may be performed by the dialog manager 150.

At block 705 of the method 700, the dialog policy subsystem 154 accesses the execution result. As described above, the execution result may be provided by the execution subsystem 156 based on the result of executing the intermediate logical form 335 (e.g., executing a query representing the intermediate logical form 335).

At decision block 710, the dialog policy subsystem 154 determines whetherexecution of the intermediate logical form 335 failed. For instance, the dialog policy sub system 154 can determine whether the execution failed by inspecting execution result, which indicates any such failure in some embodiments. As described above, an embodiment of the execution sub system 156 provided an execution result that conveyed the database output, and thus, if such database output was a failure, then the execution result may indicate as much. If the execution failed, then the method proceeds to block 715, where the dialog policy subsystem 154 constructs the output logical form 340 to indicate an error in execution.

However, if the execution did not fail, then the method skips ahead to block 720. At block 720, the dialog policy subsystem 154 constructs an output logical form 340 based on the execution result. For instance, the dialog policy subsystem 154 may access a mapping of execution results to formats, and the dialog policy subsystem 154 may apply such mapping to the execution result to determine a format for the output logical form 340. As needed, the dialog policy subsystem 154 may fill one or more attributes into that format by using contextual information in the context stack 158. Given the output logical form 340, the dialog system 100 can then provide an output, such as a speech output 122, to the user as described above.

Figure 8:
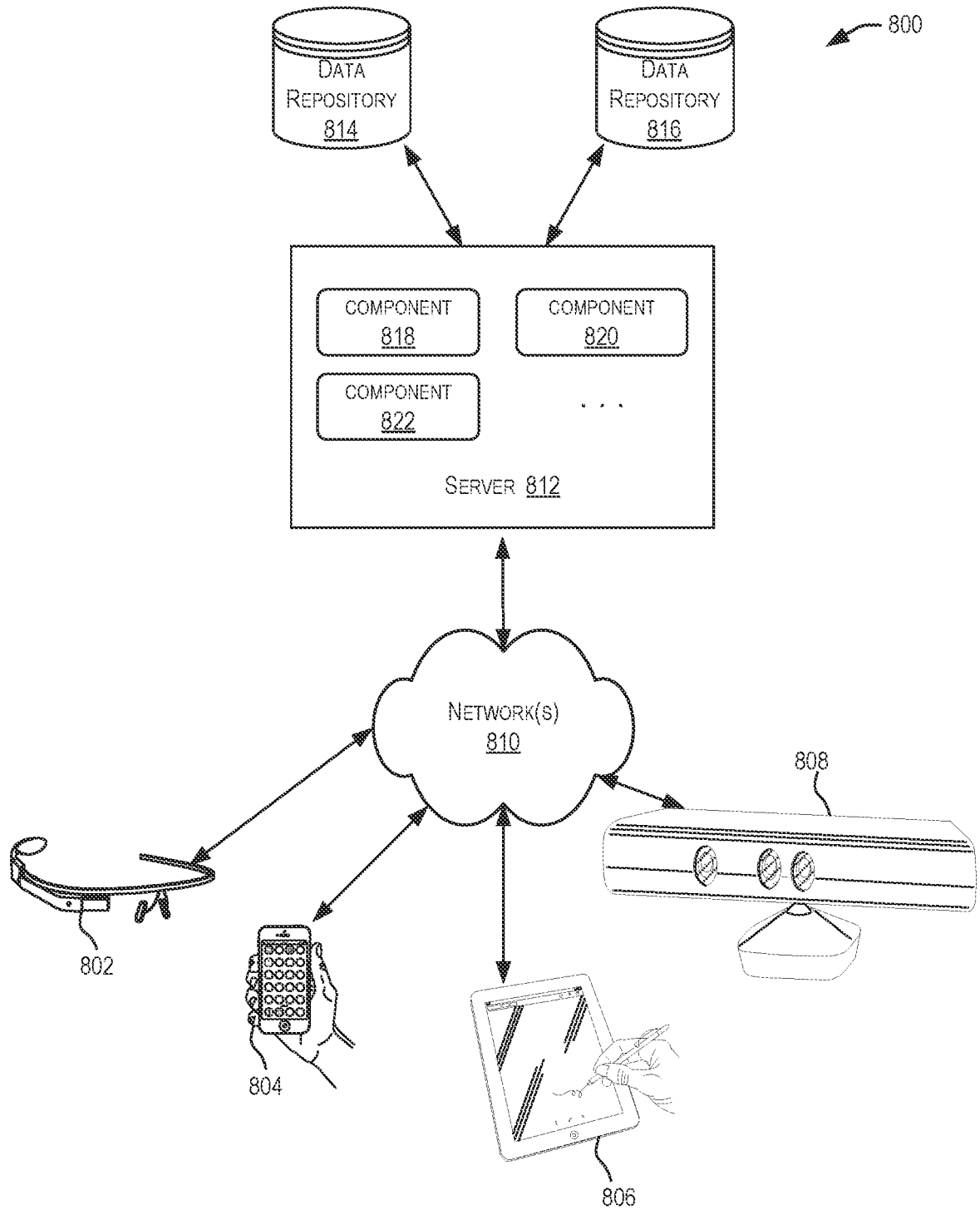
FIG. 8 is a diagram of a distributed system for implementing some embodiments described herein.

FIG. 8 is a diagram of a distributed system 800 for implementing certain embodiments. In the illustrated embodiment, distributed system 800 includes one or more client computing devices 802, 804, 806, and 808, coupled to a server 812 via one or more communication networks 810. Clients computing devices 802, 804, 806, and 808 may be configured to execute one or more applications.

In various embodiments, server 812 may be adapted to run one or more services or software applications to implement a dialog manager 150 of a dialog system 100 as described herein. For instance, server 812 may execute some or all aspects of the dialog state tracker 152, the dialog policy subsystem 154, or the execution subsystem 156.

In certain embodiments, server 812 may also provide other services or software applications that can include non-virtual and virtual environments. In some embodiments, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components. More specifically, for instance, each of client computing devices 802, 804, 806, and/or 808 may be an embedded device configured to execute the dialog system 100 or, additionally or alternatively, configured to communicate with server 812 to enable server 812 to execute aspects of the dialog system 100 such as the dialog manager 150 described herein.

In the configuration depicted in FIG. 8, server 812 may include one or more components 818, 820 and 822 that implement the functions performed by server 812. These components may include software components that may be executed by one or more processors, hardware components, or combinations thereof. It should be appreciated that various different system configurations are possible, which may be different from distributed system 800. The embodiment shown in FIG. 8 is thus one example of a distributed system for implementing an embodiment system and is not intended to be limiting.

Users may use client computing devices 802, 804, 806, and/or 808 to interact with aspects of the dialog system 100 provided by server 812 in accordance with the teachings of this disclosure. A client device may provide an interface (e.g., a speech interface) that enables a user of the client device to interact with the client device. The client device may also output information to the user via this interface. Although FIG. 8 depicts only four client computing devices, any number of client computing devices may be supported.

The client devices may include various types of computing systems such as PA devices, portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phoned, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 810 can be a local area network (LAN), networks based on Ethernet, Token-Ring, a wide-area network (WAN), the Internet, a virtual network, a virtual private network (VPN), an intranet, an extranet, a public switched telephone network (PSTN), an infrared network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization such as one or more flexible pools of logical storage devices that can be virtualized to maintain virtual storage devices for the server. In various embodiments, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information in certain embodiments. For example, one or more of data repositories 814, 816 may be used to store a context stack 158, a database, or other data used by the dialog manager 150 as described herein. Data repositories 814, 816 may reside in a variety of locations. For example, a data repository used by server 812 may be local to server 812 or may be remote from server 812 and in communication with server 812 via a network-based or dedicated connection. Data repositories 814, 816 may be of different types. In certain embodiments, a data repository used by server 812 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 814, 816 may also be used by applications to store application data. The data repositories used by applications may be of different types such as, for example, a key-value store repository, an object store repository, or a general storage repository supported by a file system.

Figure 9:
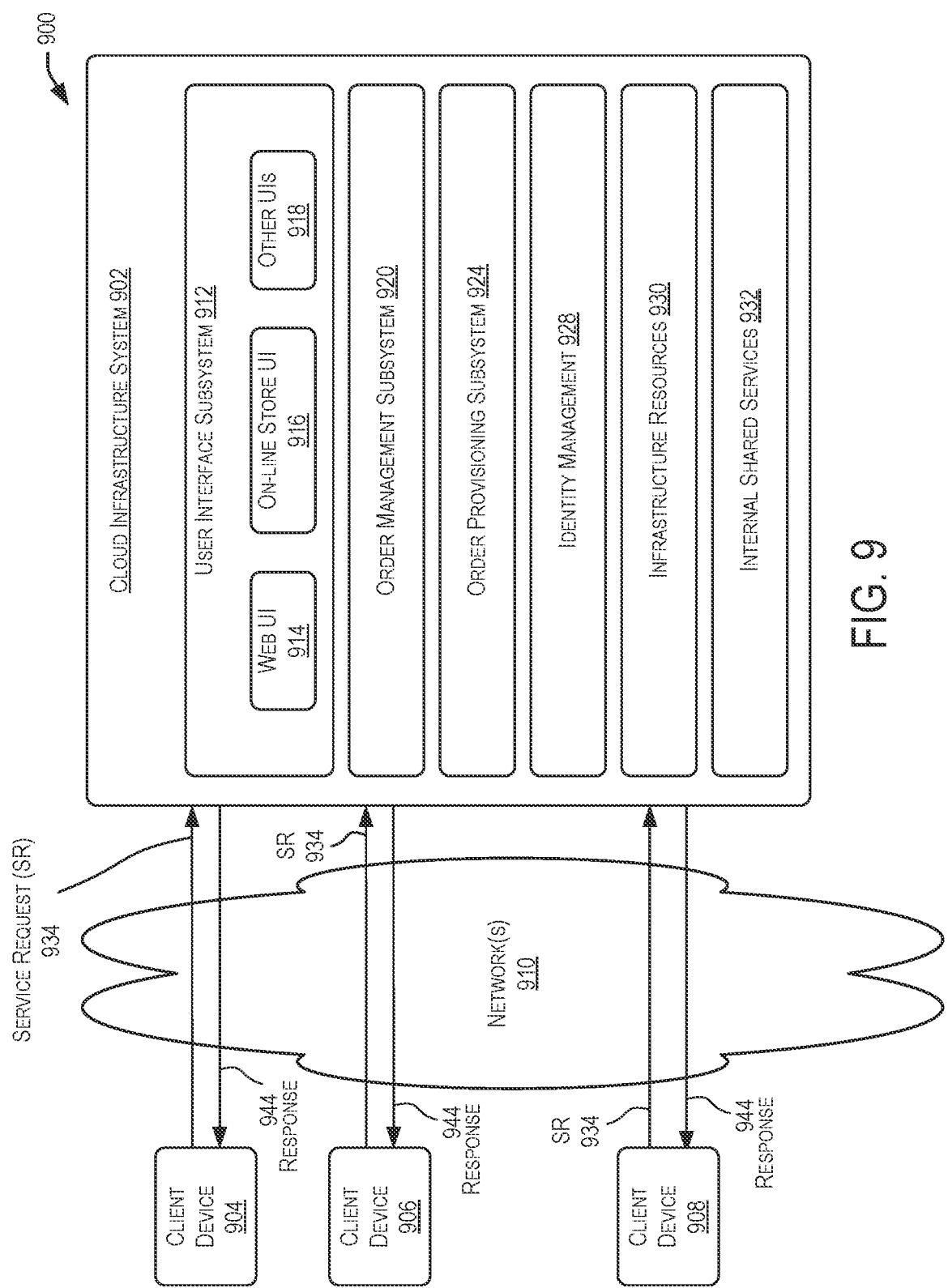
FIG. 9 is a diagram of a cloud-based system environment in which training a semantic parser in a generative adversarial network may be offered at least in part as a cloud service, according to some embodiments described herein.

In certain embodiments, all or a portion of a dialog manager 150, as described herein, may be offered as services via a cloud environment. FIG. 9 is a block diagram of a cloud-based system environment in which operations of the dialog manager 150, as described herein, may be offered at least in part as a cloud service, in accordance with certain embodiments. In the embodiment depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 812. The computers in cloud infrastructure system 902 may be organized as general purpose computers, specialized server computers, server farms, server clusters, or any other appropriate arrangement and/or combination.

Network(s) 910 may facilitate communication and exchange of data between client computing devices 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The embodiment depicted in FIG. 9 is only one example of a cloud infrastructure system and is not intended to be limiting. It should be appreciated that, in some other embodiments, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative embodiments.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. For example, a customer may subscribe to information services or other services provided by the dialog system 100 in conversational form. Cloud infrastructure system 902 may be configured to provide one or even multiple cloud services.

Cloud infrastructure system 902 may provide the cloud services via different deployment models. In a public cloud model, cloud infrastructure system 902 may be owned by a third party cloud services provider and the cloud services are offered to any general public customer, where the customer can be an individual or an enterprise. In certain other embodiments, under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 902 and the services provided may be shared by several organizations in a related community. Various other models such as hybrids of the above mentioned models may also be used.

Client computing devices 904, 906, and 908 may be of different types (such as client computing devices 802, 804, 806, and 808 depicted in FIG. 8) and may be capable of operating one or more client applications. A user may use a client computing device to interact with cloud infrastructure system 902, such as to request a service provided by cloud infrastructure system 902. An attacker may use a client device to send malicious requests.

In some embodiments, the processing performed by cloud infrastructure system 902 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 902 for providing operation of a dialog manager 150 or other aspects of a dialog system 100 described herein. The data used for this analysis may include structured data (e.g., data stored in a database or structured according to a structured model) and/or unstructured data (e.g., data blobs (binary large objects)).

As depicted in the embodiment in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like.

In certain embodiments, to facilitate efficient provisioning of these resources for supporting the various cloud services provided by cloud infrastructure system 902 for different customers, the infrastructure resources 930 may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and that facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to.

In certain embodiments, such as the embodiment depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke an order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain embodiments, cloud infrastructure system 902 comprises an identity management subsystem (IMS) 928 that is configured to manage customers information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
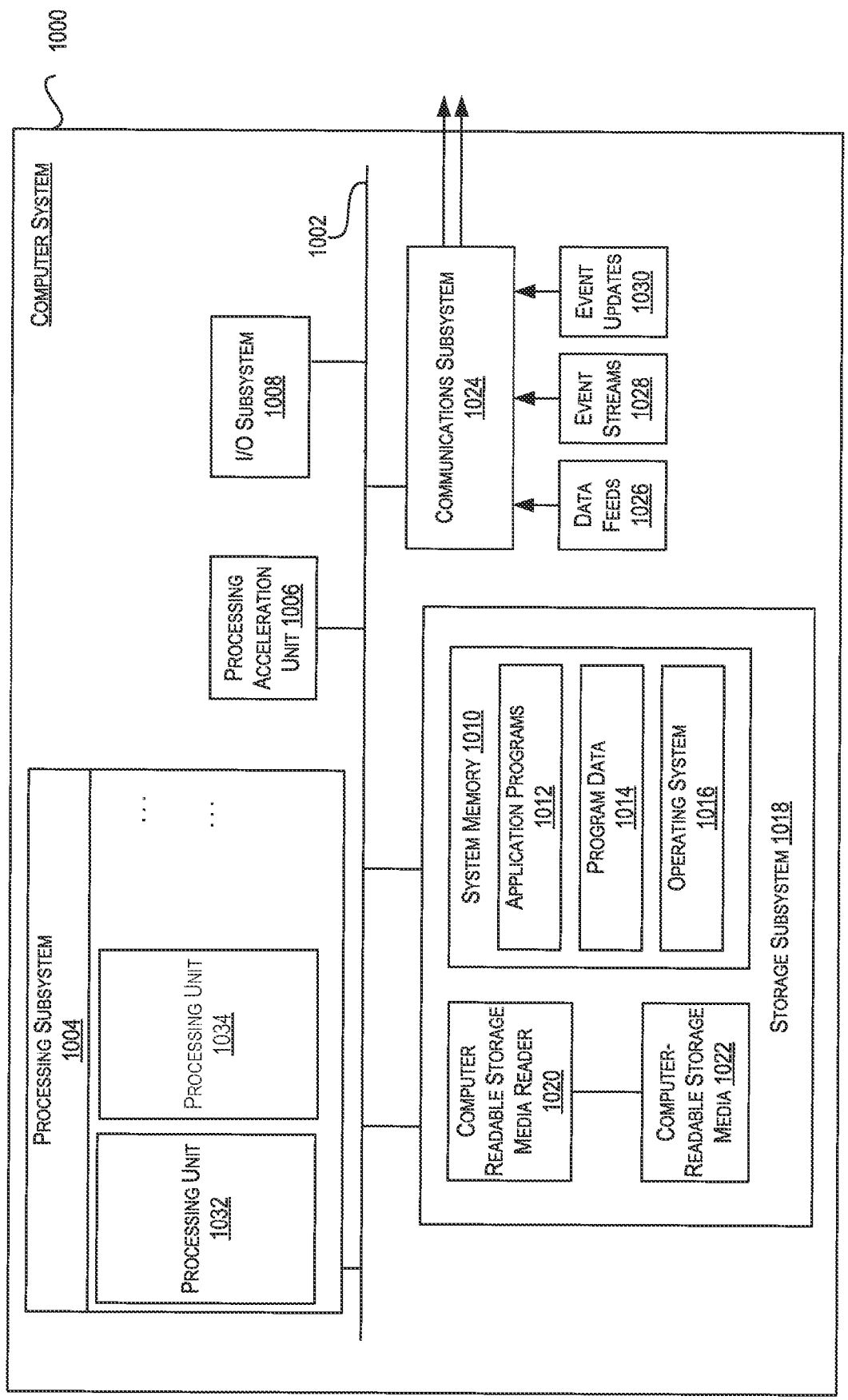
FIG. 10 is a diagram of an example computer system that may be used to implement some embodiments described herein.

FIG. 10 is a block diagram of an example computer system 1000 that may be used to implement certain embodiments. For example, in some embodiments, computer system 1000 may be used to implement any of systems, subsystems, and components described herein. For example, multiple host machines may provide and implement a dialog manager 150 or other aspects of the dialog system 100 described herein. Computer systems such as computer system 1000 may be used as host machines. As shown in FIG. 10, computer system 1000 includes various subsystems including a processing subsystem 1004 that communicates with a number of other subsystems via a bus subsystem 1002. These other subsystems may include a processing acceleration unit 1006, an I/O subsystem 1008, a storage subsystem 1018, and a communications subsystem 1024. Storage subsystem 1018 may include non-transitory computer-readable storage media including storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEEP1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 can be organized into one or more processing units 1032, 1034, etc. A processing unit may include one or more processors, one or more cores from the same or different processors, a combination of cores and processors, or other combinations of cores and processors. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer-readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above. In instances where computer system 1000 is executing one or more virtual machines, one or more processing units may be allocated to each virtual machine.

In certain embodiments, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some embodiments. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide a repository for storing data used in accordance with the teachings of this disclosure.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

In certain embodiments, software instructions or code implementing a dialog manager 150 or other aspects of the dialog system 100, as described herein, may be executed in system memory 1010.

Computer-readable storage media 1022 may store programming and data constructs that provide the functionality of some embodiments. Computer-readable storage media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include a computer-readable storage media reader 1020 that can further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, in addition to other forms, communications subsystem 1024 may receive input communications in the form of structured and/or unstructured data feeds 1026, event streams 1028, event updates 1030, and the like. For example, communications sub system 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A system comprising:
   a set of one or more processors, the set of one or more processors configured to perform processing comprising:
   generating an intermediate logical form for a speech input within a conversation, the generating based on the speech input and contextual data corresponding to the conversation;
   translating the intermediate logical form to a query;
   executing the query against a database;
   selecting an execution result from a predefined set of execution results based on execution of the query against the database;
   generating an output logical form based on the execution result; and
   outputting a response to the speech input, based on the output logical form.

2. The system of claim 1, wherein a rules-based process is followed to generate the intermediate logical form based on the speech input and the contextual data.

3. The system of claim 1, wherein:
   the speech input includes a follow-up; and
   to generate the intermediate logical form, a type of the follow-up is determined based on an input logical form, and the intermediate logical form is generated by applying, to the speech input and the contextual data, a rule selected based on the type of the follow-up.

4. The system of claim 1, wherein:
   the speech input does not include a follow-up; and
   to generate the intermediate logical form, the intermediate logical form is set equal to an input logical form.

5. The system of claim 1, wherein the processing further comprises updating the contextual data based on the intermediate logical form and the execution result.

6. The system of claim 1, wherein the processing further comprises:
   identifying a primary entity in the speech input; and
   identifying an action to be taken with respect to the primary entity according to the speech input.

7. The system of claim 1, wherein the processing further comprises converting the speech input to an input logical form.

8. The system of claim 1, wherein a machine learning model is utilized to generate an input logical form based on the speech input.

9. A system comprising:
a set of one or more processors, the set of one or more processors configured to perform processing comprising:
identifying a speech input within a conversation, the speech input including a follow-up;
determining a type of the follow-up;
generating an intermediate logical form for the speech input, the generating based on the speech input, contextual data corresponding to the conversation, and a rule selected based on the type of the follow-up;
translating the intermediate logical form to a query;
executing the query against a database;
selecting an execution result from a predefined set of execution results based on execution of the query against the database;
generating an output logical form based on the execution result; and
outputting a response to the speech input, based on the output logical form.

10. The system of claim 9, wherein a rules-based process is followed to generate the intermediate logical form based on the speech input, the contextual data, and the selected rule.

11. The system of claim 9, wherein the processing further comprises updating the contextual data based on the intermediate logical form and the execution result.

12. The system of claim 9, wherein the processing further comprises:
identifying a primary entity in the speech input; and
identifying an action to be taken with respect to the primary entity according to the speech input.

13. The system of claim 9, wherein the processing further comprises converting the speech input to an input logical form.

14. The system of claim 9, wherein a machine learning model is utilized to generate an input logical form based on the speech input.

15. A system comprising:
a set of one or more processors, the set of one or more processors configured to perform processing comprising:
identifying a speech input within a conversation, the speech input lacking a follow-up;
generating an intermediate logical form for the speech input, the generating based on the speech input, contextual data corresponding to the conversation, and an input logical form representing the speech input;
translating the intermediate logical form to a query;
executing the query against a database;
selecting an execution result from a predefined set of execution results based on execution of the query against the database;
generating an output logical form based on the execution result; and
outputting a response to the speech input, based on the output logical form.

16. The system of claim 15, wherein a rules-based process is followed to generate the intermediate logical form based on the speech input, the contextual data, and the input logical form.

17. The system of claim 15, wherein the processing further comprises updating the contextual data based on the intermediate logical form and the execution result.

18. The system of claim 15, wherein the processing further comprises:
identifying a primary entity in the speech input; and
identifying an action to be taken with respect to the primary entity according to the speech input.

19. The system of claim 15, wherein the processing further comprises converting the speech input to the input logical form.

20. The system of claim 15, wherein a machine learning model is utilized to generate an input logical form based on the speech input.

* * * * *

UNITED STATES PATENT AND TRADEMARK OFFICE
CERTIFICATE OF CORRECTION

| | |
|---|---|
| PATENT NO. | : 11,790,901 B2 |
| APPLICATION NO. | : 18/092170 |
| DATED | : October 17, 2023 |
| INVENTOR(S) | : Duong et al. |

It is certified that error appears in the above-identified patent and that said Letters Patent is hereby corrected as shown below:

On the Title Page

Column 1, under item (72) Inventors, Line 11, delete "Ercé-pèrs-Liffré" and insert
-- Ercé-près-Liffré --, therefor.

On page 2, Column 1, under item (56) Other Publications, Line 16, delete "SemanticParserOvemight" and insert -- Semantic Parser Overnight --, therefor.

On page 2, Column 1, under item (56) Other Publications, Line 18, delete "DialogueActs" and insert
-- Dialogue Acts --, therefor.

On page 2, Column 1, under item (56) Other Publications, Line 20, delete "Leaming" and insert
-- Learning --, therefor.

In the Specification

In Column 3, Line 29, delete "orto" and insert -- or to --, therefor.

In Column 3, Line 60, delete "subsystems" and insert -- sub systems --, therefor.

In Column 5, Line 27, delete "notbe" and insert -- not be --, therefor.

In Column 6, Line 55, delete "subsystem" and insert -- sub system --, therefor.

In Column 7, Line 1, delete "maybe" and insert -- may be --, therefor.

In Column 7, Line 45, delete "UIgenerator" and insert -- UI generator --, therefor.

In Column 7, Line 46, delete "UIgenerator" and insert -- UI generator --, therefor.

Signed and Sealed this
Twenty-fifth Day of June, 2024

Katherine Kelly Vidal
*Director of the United States Patent and Trademark Office*

CERTIFICATE OF CORRECTION (continued)
U.S. Pat. No. 11,790,901 B2

In Column 7, Line 49, delete "UIgenerator" and insert -- UI generator --, therefor.

In Column 7, Line 59, delete "UIgenerator" and insert -- UI generator --, therefor.

In Column 8, Line 2, delete "UIgenerator" and insert -- UI generator --, therefor.

In Column 8, Line 56, delete "device) however." and insert -- device. --, therefor.

In Column 9, Line 31, delete "systems" and insert -- systems. --, therefor.

In Column 10, Line 21, delete "fromlogical" and insert -- from logical --, therefor.

In Column 10, Line 45, delete "topicidentifies" and insert -- topic identifies --, therefor.

In Column 10, Line 54-55, delete "sub systems" and insert -- subsystems --, therefor.

In Column 11, Line 8, after "be" delete "based on", therefor.

In Column 11, Line 49, delete "whichis" and insert -- which is --, therefor.

In Column 12, Line 40, delete "alarm)." and insert -- alarm"). --, therefor.

In Column 13, Line 48, delete "by" and insert -- be --, therefor.

In Column 14, Line 28, delete "howto" and insert -- how to --, therefor.

In Column 15, Line 8, delete "userto" and insert -- user to --, therefor.

In Column 15, Line 11, delete "userto" and insert -- user to --, therefor.

In Column 15, Line 22, delete "UIgenerator" and insert -- UI generator --, therefor.

In Column 16, Line 54, delete "maybe" and insert -- may be --, therefor.

In Column 18, Line 12, delete "subsystem" and insert -- sub system --, therefor.

In Column 18, Line 55, delete "inputlogical" and insert -- input logical --, therefor.

In Column 19, Line 4, delete "inputlogical" and insert -- input logical --, therefor.

In Column 20, Line 20, delete "atline" and insert -- at line --, therefor.

In Column 20, Line 21, delete "atline" and insert -- at line --, therefor.

In Column 20, Line 22, delete "startof" and insert -- start of --, therefor.

CERTIFICATE OF CORRECTION (continued)
U.S. Pat. No. 11,790,901 B2

In Column 22, Line 32, delete "whetherexecution" and insert -- whether execution --, therefor.

In Column 23, Line 51, delete "Phoned," and insert -- Phone®, --, therefor.

In Column 27, Line 9, delete "sy stem" and insert -- system --, therefor.

In Column 32, Line 51, delete "evolution)," and insert -- evolution)), --, therefor.